United States Patent
Gupta et al.

(10) Patent No.: US 10,979,377 B1
(45) Date of Patent: Apr. 13, 2021

(54) MULTI-MESSAGE CONVERSATION SUMMARIES AND ANNOTATIONS

(71) Applicant: Microsoft Technology Licensing, LLC, Redmond, WA (US)

(72) Inventors: Vipul Gupta, Bangalore (IN); Aparajita, Bangalore (IN); Arun K. Dixit, Bangalore (IN); Supriya A. Supugade, Bangalore (IN); Manish Sharma, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/897,162

(22) Filed: Jun. 9, 2020

(51) Int. Cl.
*H04L 29/06* (2006.01)
*H04L 12/58* (2006.01)

(52) U.S. Cl.
CPC .................................. *H04L 51/16* (2013.01)

(58) Field of Classification Search
CPC ....................................................... H04L 51/16
See application file for complete search history.

(56) References Cited

U.S. PATENT DOCUMENTS

| | | | |
|---|---|---|---|
| 6,816,884 B1 | 11/2004 | Summers | |
| 10,003,561 B2 | 6/2018 | Duze et al. | |
| 10,467,630 B2 | 11/2019 | Iyer et al. | |
| 2012/0173633 A1 | 7/2012 | Balabhadrapatruni et al. | |
| 2014/0222933 A1* | 8/2014 | Stovicek | G06Q 10/107 709/206 |
| 2015/0350143 A1* | 12/2015 | Yang | H04M 1/72552 345/173 |
| 2017/0012927 A1 | 1/2017 | Wollan fan et al. | |
| 2017/0155607 A1 | 6/2017 | Chakra et al. | |
| 2017/0222963 A1 | 8/2017 | Jobanputra et al. | |

OTHER PUBLICATIONS

Wan, et al., "Generating Overview Summaries of Ongoing Email Thread Discussions", In Proceedings of the 20th International Conference on Computational Linguistics, Aug. 23, 2004, 7 Pages.

* cited by examiner

*Primary Examiner* — Adnan M Mirza

(57) ABSTRACT

The disclosure herein describes a system for generating customizable summaries of multi-message conversations in email threads and other multi-message and multi-participant messaging applications. A summary icon is displayed if the number of messages in a thread exceeds a threshold number. Message data is cleaned and analyzed by ML models to generate feature vectors representing the messages content. Multiple loglinear regression models compute similarity between message sentences. Clustering algorithm(s) to generate a multi-message conversation thread summary based on the values. If the user selects the summary icon, the multi-message conversation thread summary is displayed. The summary includes summary sentences and/or annotations describing content of the messages in the thread, participants contributing to the messages in the thread, links back to the original messages in the thread and/or a count of the number of messages contributed by each participant.

20 Claims, 20 Drawing Sheets

Create Rule    ×

| General | Summary |

Summary Title _____

When I get a mail thread with one or more of the selected conditions

☐ From _____

☐ Subject Contains _____

Choose a Fit

○ Float

○ Dock

Summary Type

○ Small

○ Large

Template

Problem

Investigation

Mitigation \*\*

Solution

☐ Participants and Mail Count

☐ On Hover Sender Name

[ OK ]  [ Cancel ]  [ Apply ]

1102 Dan Gent

Summary:-

Lorem ipsum dolor sit amet, consectetur adipiscing elit. Quisque tristique vel nisl ac rhoncus. Pellentesque imperdiet velit hendrerit sapien luctus, id luctus ligula pulvinar. Pellentesque habitant morbi tristique senectus et netus et malesuada fames ac turpis egestas. Etiam sem arcu, cursus sit amet porta vel, consectetur id nunc. Nullam eget porta tortor. Quisque faucibus dui sit amet dolor aliquam fermentum. Morbi metus tellus, fermentum eget dignissim a, vulputate at arcu. Ut sagittis ut urna vel finibus. Vestibulum ante ipsum primis in faucibus orci luctus et ultrices posuere cubilia curae; Morbi pellentesque sem eget enim facilisis mattis. Aenean porta sagittis sodales. Duis at neque vehicula quam iaculis rhoncus. Aliquam metus est, aliquam porttitor sollicitudin sed, facilisis sit amet ex.

Cras et eleifend erat. Sed sodales laoreet vulputate. Aliquam interdum sem nec est sollicitudin, mollis consectetur nisi consectetur. Aenean tincidunt, diam eu bibendum congue, nulla augue tincidunt leo, at lacinia dolor orci nec quam. Nam et interdum libero. Nullam a lorem vel nisl pretium varius. Fusce orci mi, ultrices in auctor sed, porttitor ac massa. In vulputate elementum ipsum eu pellentesque. Donec et felis dolor. Fusce rutrum mauris ac dui mattis, at pellentesque enim sollicitudin. Duis ut interdum urna, sed sagittis elit. Curabitur viverra massa libero, quis dignissim felis lacinia eget. Suspendisse potenti.

Participants:-

Dan Gent (5)
Matthew Anderson (4)
Joan Staff (2)
RHM (2)
JDL (2)
Sarah Marsh (1)

MULTI-MESSAGE CONVERSATION SUMMARIES AND ANNOTATIONS

BACKGROUND

Every day the users of email and other messaging applications receive long email or other message threads which contain conversations between multiple participants and a lot of questions and answers, or discussion about various topics. The participants contributing messages to the thread might be reaching an agreement on something common or raising various solutions to a problem. Moreover, these long messaging threads frequently have a lot of context and details of issues being discussed. There might be resolution to the issue, change in direction of discussion, or a mitigation agreed upon and being executed. However, it can be difficult or impossible to understand the full context without manually reading through the entire conversation thread in its entirety, one message at a time, to try and understand it. This can be a confusing, time-consuming, frustrating, and inefficient process for human users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a system for generating customized multi-message conversation summaries. A user interface device presents a summary icon associated with a multi-message conversation listing representing a multi-message conversation thread within a message list panel if the number of messages in the multi-message conversation thread exceeding a threshold number of messages. A customizable message summary component creates a summary of a plurality of messages in the multi-message conversation thread, the summary comprising a set of participants contributing at least one message in the plurality of messages and a set of summary sentences summarizing contents of a set of source messages in the plurality of messages. A set of links associated with the set of summary sentences are mapped to the set of source messages, wherein activation of a link in the set of links associated with a summary sentence in the set of summary sentences triggers display of at least a portion of at least one source message in the set of source messages from which at least a portion of the content of the summary sentence is derived.

Other examples provide a method of generating customized multi-message conversation summaries. An icon manager component generates a summary icon associated with a multi-message conversation listing representing a multi-message conversation thread within a message list panel having a number of messages in the multi-message conversation thread exceeding a threshold number of messages. An analysis component creates a summary of a plurality of messages in the multi-message conversation thread in response to a selection of the summary icon. The summary includes a set of participants contributing at least one message in the plurality of messages and a set of summary sentences summarizing contents of a set of source messages in the plurality of messages. The summary is displayed within a summary display panel of a user interface in response to a selection of the summary icon. A mapping component maps a set of links associated with the set of summary sentences to a set of source messages. A source message in the set of source messages is displayed within a message display panel of the user interface in response to activation of a link in the set of links associated with a summary sentence in the set of summary sentences. The source message is a message from which at least a portion of the content of the summary sentence is derived.

Still other examples provide a computer storage device having computer-executable instructions stored thereon for generating customized multi-message conversation summaries, which, on execution by a computer, cause the computer to perform operations including presenting a summary icon associated with a multi-message conversation in response to a number of messages in the multi-message conversation thread exceeding a threshold number of messages; creating a summary of the multi-message conversation thread, including, in one non-limiting example of metadata, a listing of the participants contributing at least one message within the multi-message conversation thread and at least one summary sentence summarizing contents of the multi-message conversation thread. Activation of a link associated with a summary sentence in the set of summary sentences triggers display of at least a portion of at least one source message in the set of source messages from which at least a portion of the content of the summary sentence is derived.

BRIEF DESCRIPTION OF THE DRAWINGS

The disclosed examples are described in detail below with reference to the accompanying drawing figures listed below:

FIG. 8 is an exemplary block diagram illustrating a summary icon associated with a multi-message conversation thread.

FIG. 9 is an exemplary block diagram illustrating a summary associated with a selected message thread.

FIG. 10 is an exemplary block diagram illustrating a set of user-configurable options for customizing a summary.

FIG. 11 is an exemplary block diagram illustrating a hover on option.

FIG. 12 is an exemplary block diagram illustrating a link back to a source message in a multi-message thread.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Some aspects of the disclosure describe a system for generating customized summaries of multi-message conversation threads, such as, but not limited to, email threads or other messaging threads. The multi-message conversation summaries enable improved user efficiency reading, sorting, and managing messages via the user interface (UI).

In other examples, a set of links in the summaries enable users to link back to the original emails from which at least a portion of the summary content is obtained. This improves user's ability to efficiently locate information within multi-email threads without manually reading through each and every message.

Other aspects provide customizable summaries of conversations according to each user's own needs and/or preferences. In some examples, users can add new rules to customize a summary of a mail-thread, choose a template for the summary, define rules according to subject and/or sender of mail, and/or choose fit/layout along with verbosity of the summary. This enables each user to obtain preferred types of summary information in a customizable format adapted to the unique situation and use case of each user for improved user experience managing long message threads.

In still other examples, the system includes an option to provide the user with a list of all the participants with mail count and an 'on hover sender name' option, providing the user with a name of a sender of mail contributing to part of the summary. This enables users to quickly identify the author of a given message and/or manage message content more quickly and effectively.

Figure 1:
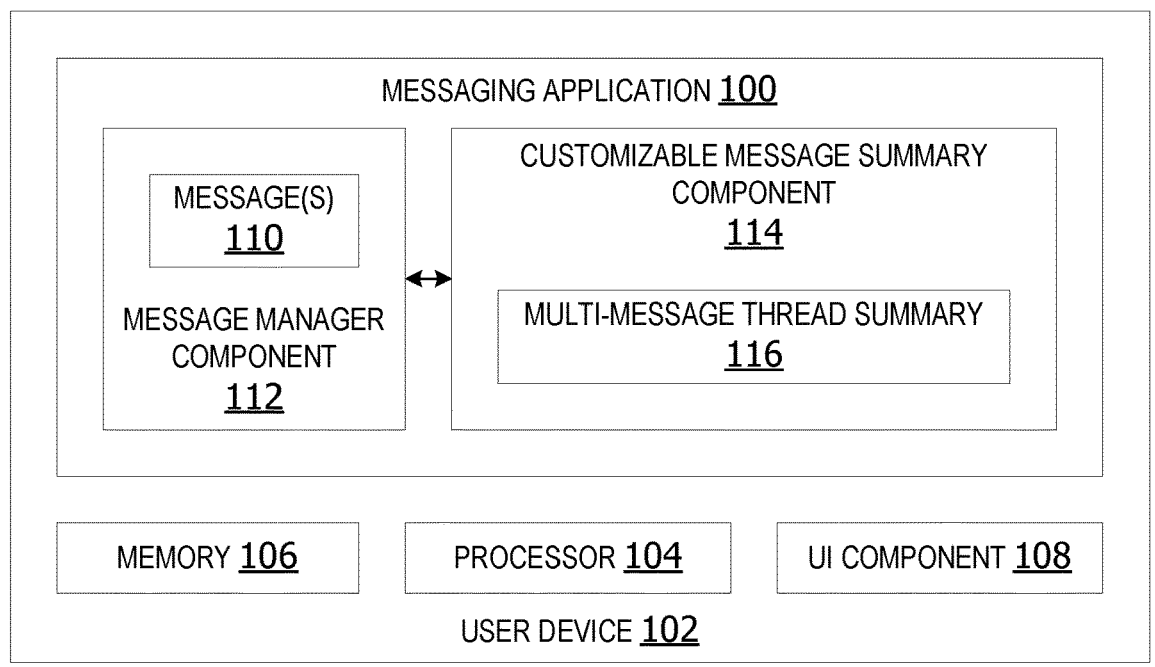
FIG. 1 is an exemplary block diagram illustrating a messaging application including a customizable message summary component for generating customizable multi-message thread summaries.

FIG. 1 is an exemplary block diagram illustrating a messaging application 100 including a customizable message summary component for generating customizable multi-message thread summaries In some examples, the messaging application 100 is any type of application that sends and receives messages from one or more users, such as, but not limited to, an email application, texting application, messaging application, group chat application, social media application, etc. The messaging application 100 in other examples can be implemented as applications such as, but not limited to, Outlook™, Teams, Yammer™ WhatsApp™, Gmail™, Google™ Talk, or any other application enabling exchange of multiple messages in a common thread between multiple users. The messaging can be in real-time or delayed.

The user device 102 in some examples represents any device executing computer-executable instructions. The user device 102 can be implemented as a mobile computing device, such as, but not limited to, a wearable computing device, a mobile telephone, laptop, tablet, computing pad, netbook, gaming device, and/or any other portable device. The user device 102 includes at least one processor 104 and a memory 106. The user device 102 can also include a UI component 108 for displaying message(s) 110 and message summaries to a user, such as a graphical user interface (GUI) output to users.

The message(s) 110 in some non-limiting examples includes a set of two or more messages in a multi-message thread. The message(s) 110 can include human-to-human messaging (human conversation), as well as human-to-machine messaging. The message(s) are managed by a message manager component 112. The message manager component sends messages authored by the user and receives messages from one or more other users.

The customizable message summary component 114 in some examples is an application, plug-in, or add-on for generating customizable multi-message conversation thread summarizations. The customizable message summary component 114 can be a stand-alone application or an application which is added onto another messaging application, such as a plug-in or add-on to a message application. The customizable message summary component 114 analyzes the message(s) 110 and generates a multi-message thread summary 116 summarizing the message(s).

The messaging application in some non-limiting examples interacts with the customizable message summary component to generate the summaries. In an example, the user installs the customizable message summary component as an application, add-on, or plug-in. If an email thread exceeds the threshold number of messages in a conversation, the customizable message summary component shows the summary icon button in the UI. The user clicks or selects the icon to open the right summary display pane. Upon activation, the customizable message summary component communicates or otherwise exchanges data with the messaging application via one or more message application programming interfaces (APIs).

The APIs assist the customizable message summary component in creating the UI, including the summary icon, links, etc. In some examples, the customizable message summary component 114 is configured to display the summary icon in correspondence with a multi-message listing based on response(s) from the API(s).

In other examples, the system includes a macro which works behind the scenes (i.e. application daemon) with the existing APIs associated with the messaging application receiving the messages. The existing APIs provide messaging data to the system for utilization generating the summaries.

In some examples, the customizable message summary component 114 provides conversation summary with customizable templates to create user-configured conversation summary with rich annotations and features. The summaries are context-aware where each sentence in the summary has an annotation indicating who authored the email from which the sentence is extracted, links to the original email, top participants etc.

In other examples, the customizable message summary component 114 generates a summary icon for email threads. When the icon is selected, the customizable message summary component 114 displays the thread summary. The summary is displayed within a summary panel within an email user interface. In some examples, the summary panel is a "side panel" located on the left side of the UI display. In other examples, the summary panel is located on the right side, along the bottom of the display, within a corner of the display, near a top portion of the display, or anywhere else within the UI display space. User defined rules are provided for customizing summary fit and/or layout, verbosity of summary and other formatting features, such as the hover over sender name feature associated with summary sentences. The rules associated with layout are customizable to adjust or change the location of the summary panel, the summary icon or other features displayed on the UI.

Figure 2:
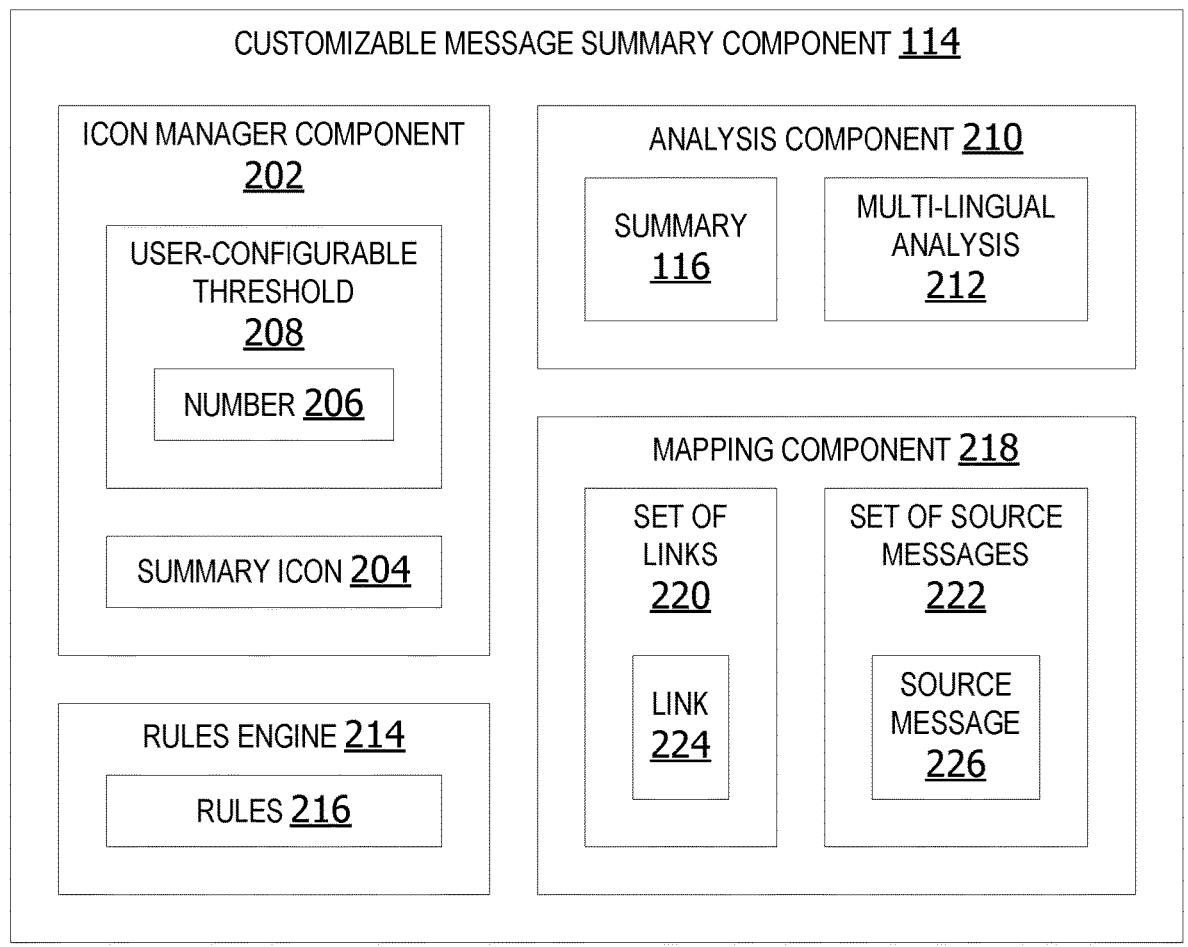
FIG. 2 is an exemplary block diagram illustrating a customizable message summary component for analyzing multi-message conversation threads and generating customized summaries.

FIG. 2 is an exemplary block diagram illustrating a customizable message summary component 114 for analyzing multi-message conversation threads and generating customized summaries. In some examples, an icon manager component 202 generates a summary icon 204 associated with a multi-message conversation listing representing a multi-message conversation thread within a message list panel having a number of messages 206 in the multi-message conversation thread exceeding a threshold number of messages 208.

The threshold number of messages is a user-configurable number. The threshold can be any number of messages selected by a user. In some examples, the threshold number of messages is five messages. In other examples the threshold value is ten messages. In still other examples, the threshold number of messages is twenty messages.

In still other examples, the summary icon is only presented to the user if the threshold number of messages is present and one or more other parameters are present. For example, the user may specify parameters such as, but not limited to, subject keywords or sender name. In an example, the user may specify that a summary is generated or the icon presented if the threshold number of messages is reached or exceeded and the subject line of the message includes one or more keywords. This enables the user to configure the rules for generating summaries to suit each user's situation.

An analysis component 210 in other examples performs multi-lingual analysis 212 on a plurality of messages in the multi-message conversation thread to generate a summary 116 in response to a user-selection of the summary icon 204. In some non-limiting examples, the multi-lingual analysis including, for example but without limitation, text analytics, including things like data submissions, phrase extractions; sentiment analysis; language detections and/or feature set extractions.

The summary 116 includes a set of participants contributing at least one message in the plurality of messages and a set of summary sentences summarizing contents of a set of source messages in the plurality of messages. The summary is displayed or rendered within a summary display panel of a display in response to a selection of the summary icon. The summary can be displayed to the user via a user interface, such as, but not limited to, the UI component 108 of the user device 102 in FIG. 1.

In some non-limiting examples, the summary 116 is formatted for display to the user in accordance with one or more user-configurable rules 216 associated with a rules engine 214. The rules engine 214 presents the user with one or more configurable options for formatting the summary data and/or options for types of data to be included within the summary 116. The user selections may be implemented as one or more rules for formatting and/or generating the summary A mapping component 218 in still other examples maps a set of links 220 associated with the set of summary sentences in the summary 116 to a set of one or more source messages 222. A source message 226 in the set of source messages is a message in the plurality of messages which are part of the multi-message conversation thread. The contents of a source message are utilized in whole or in part to create at least a portion of a summary sentence in the summary 116. A link 224 in the set of links 220 maps one summary sentence in the summary 116 to at least one source message 226. When a user clicks on the link 224, the customizable message summary component 114 displays the source message 226 for viewing by the user in a message display panel of the UI.

Figure 3:
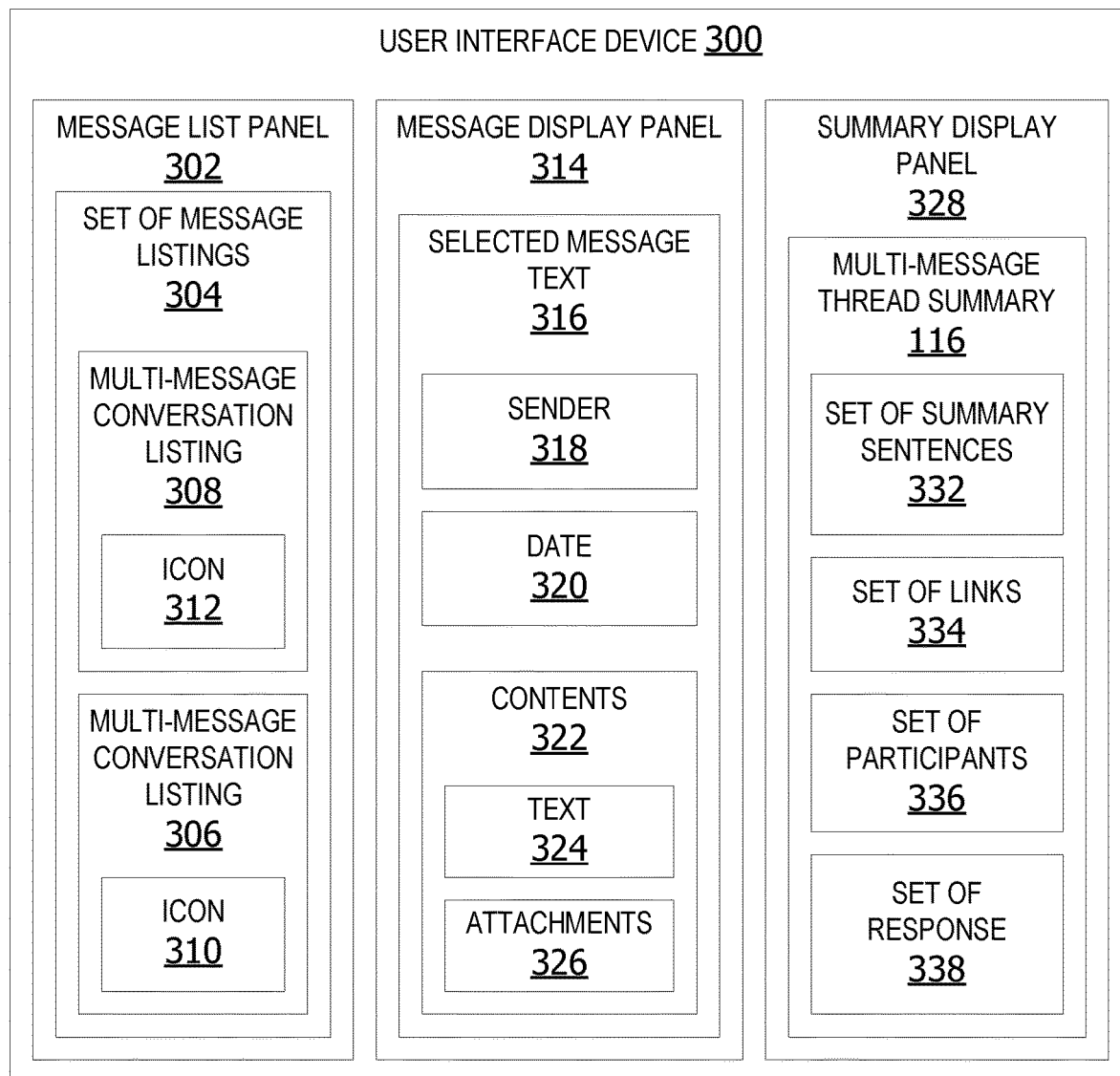
FIG. 3 is an exemplary block diagram illustrating a user interface device displaying a multi-message thread summary for a multi-message conversation thread.

FIG. 3 is an exemplary block diagram illustrating a user interface device 300 displaying a multi-message thread summary 116 for a multi-message conversation thread. In some examples, a messaging application displays a set of message listings 304 in a message list panel 302. The message list panel 302 includes a list of emails in a user's inbox. A user can select a message listing in the message list panel to view the contents of the message in the message display panel 314. The message list panel 302 enables the user to view a list of multiple messages from multiple different users spanning various subjects and send dates/times. In this example, the message list panel 302 includes a multi-message conversation listing 306 and a second multi-message conversation listing 308 representing two different email threads including multiple messages in each thread.

If the number of messages in a given email thread exceeds a threshold number, a summary icon is presented in the message list panel alongside the multi-message conversation listing 308 enabling the user to trigger display of a summary of the messages in the thread. In this example, a summary icon 310 for the first multi-message conversation listing 306 is presented inside the message list panel 302 and a second summary icon 312 for the second multi-message conversation listing 308 is also presented. However, the examples are not limited to two summary icons for two multi-message conversation threads. The examples can include a single summary icon, as well as three or more summary icons.

In this non-limiting example, the message list panel 302 is a list of emails in an email inbox. However, in other examples, the message list panel 302 can include a list of emails in a sent folder, a list of emails in a drafts folder, a list of emails in any sub-folder, a set of messages, an online conversation between different members of a group, as well as any other listing or category of messages. The set of messages can be messages in a messaging application group, such as, but not limited to, a WhatsApp™ group. An online conversation can take place between members in a group, such as, but not limited to, Yammer™.

The message display panel 314 displays the contents of a selected message text 316 for a message selected from the message list panel 302. The displayed message can include a listing of a sender 318, a date 320 when the message was sent, text 324 contents 322 of the email message, and/or any attachments 326.

If a user selects the summary icon for a given message, a multi-message thread summary 116 for the messages in the message thread is displayed in the summary display panel 328. In some examples, the summary display panel is not displayed unless the user selects the summary icon for at least one of the messages in the message list panel 302.

The multi-message thread summary 116 in some examples includes a set of one or more summary sentences 332 summarizing the contents of one or more email messages in the multi-message conversation thread. The summary 116 can optionally also include a set of one or more links 334 linking each summary sentence back to one or more original messages in the email thread from which the contents of the summary sentence is derived.

The summary 116 in other examples includes annotations. The annotations optionally include a set of participants 336 authoring one or more emails in the email thread. The annotations can optionally also include a set of one or more response counts 338. A response count is a number of messages within the multi-message thread that was authored by a given participant. The count can include the count of emails authored by each participant, the count of participants authoring emails contributing to the summary, the count of messages authored by a given participant from which portions of the summary is derived, etc. The count can optionally be expressed as a number, a percentage, a fraction, or any other quantitative value.

In some examples, the annotations can also include overall sentiment of the conversation, overall sentiment of the messages authored by each participant, and/or overall sentiment of the summary count of the number of participants authoring emails from which portions of the summary is taken, etc. The count and/or statement as to the overall sentiment of each author in some examples is presented beside each participant's name.

Figure 4:
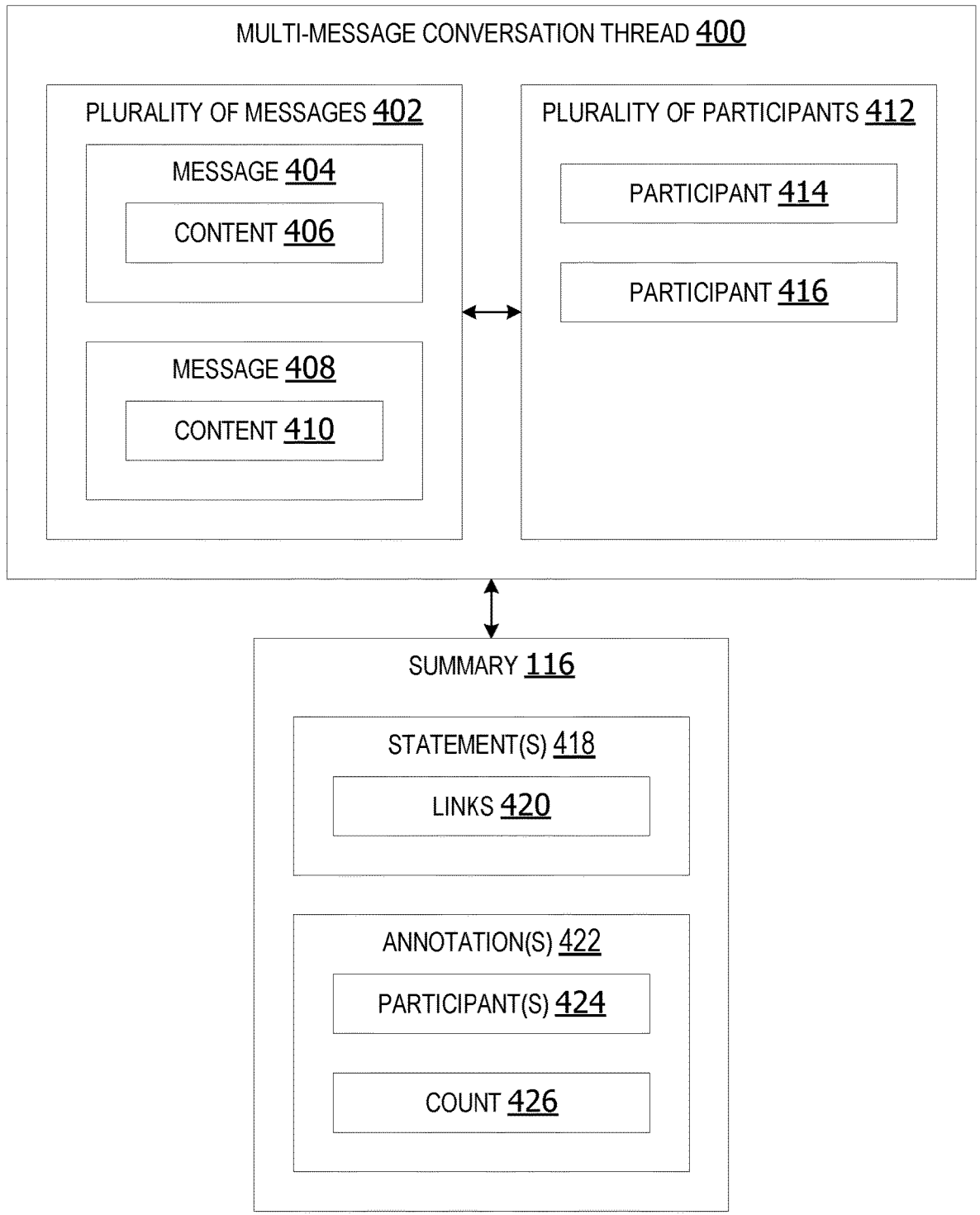
FIG. 4 is an exemplary block diagram illustrating a multi-message conversation thread summary for a multi-message conversation.

FIG. 4 is an exemplary block diagram illustrating a multi-message conversation thread 400 summary 116. The multi-message conversation thread 400 includes a plurality of messages 402 including two or more messages, such as, but not limited to, a message 404 having content 406 and a message 408 having content 410. The plurality of messages 402 in this non-limiting example includes two messages. However, the examples are not limited to two messages. In other examples, the message thread can include three or more messages. In some examples, the multi-message conversation thread includes dozens or even hundreds of messages. In one example scenario, the message thread includes fifty messages. In another example, the message thread includes one hundred email messages authored by two or more participants.

Each message in the plurality of messages 402 is authored by a participant in the plurality of participants 412, such as, but not limited to, a participant 414 and/or a participant 416. The plurality of participants 412 in this example includes two participants. However, in other examples, the plurality of participants can include three or more participants. In an example scenario, the plurality of participants includes six participants. In another example, the plurality of participants includes a dozen participants.

The summary 116 of the multi-message conversation thread 400 in some examples includes one or more statement(s) 418 summarizing the contents 406 and 410 of the messages in the plurality of messages 402. The statement(s) 418 can include one or more link(s) 420 linking the summary statement(s) 418 back to one or more of the original messages in the plurality of messages 402.

In other examples, the summary 116 includes one or more annotation(s) 422. The annotation(s) 422 can include a listing of the one or more participant(s) 424 which sent one or more of the messages in the plurality of messages 402 as well as a per-participant count 426. The per-participant count 426 is a number of messages authored or sent by each participant in the set of participants.

Figure 5:
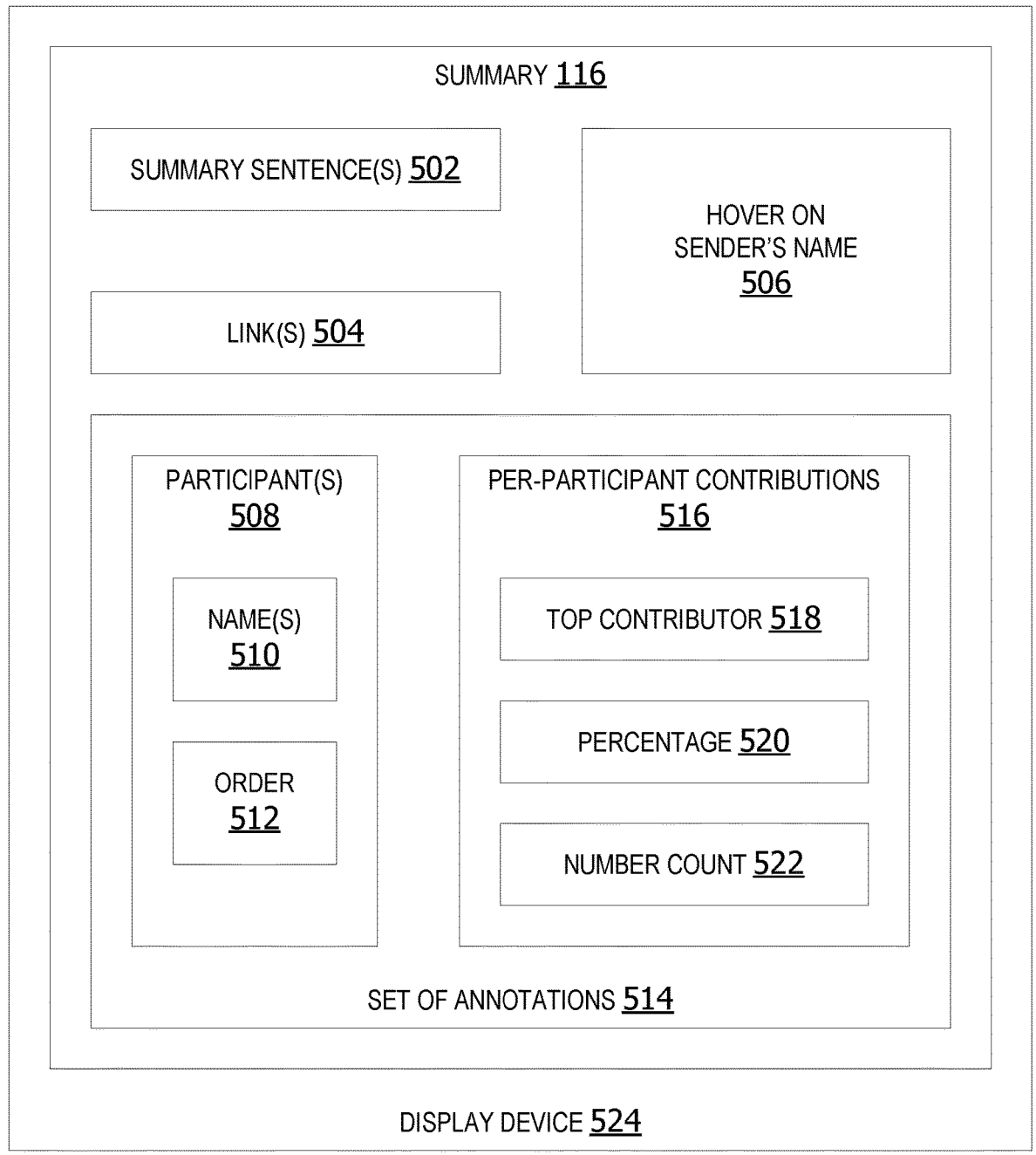
FIG. 5 is an exemplary block diagram illustrating a summary of a multi-message conversation thread.

FIG. 5 is an exemplary block diagram illustrating a summary 116 of a multi-message conversation thread. The summary 116 includes one or more summary sentence(s) 502 describing the contents of the messages. The summary 116 can also include one or more link(s) 504 back to the original emails in the email thread. If the user clicks on one of the links, the original email message mapped to the link is displayed in a message display pane.

In some examples, the summary 116 includes a hover on sender's name 506. When the user's cursor, mouse, or other input device hovers over a summary sentence in the summary 116, the name of a participant that authored or sent an original email message in the multi-message conversation thread providing the basis of the summary sentence is displayed.

The summary 116 can also include a list of the participant(s) 508. The participants list can include one or more name(s) 510 of the participants and/or present the participants in a selected order 512. The name of the participant can be a username, a legal name, a handle, a user ID, an employee ID, or any other identifier for the participant.

The order 512 in which the participants names are displayed is a user-configurable order. The order 512 can include an alphabetical order, an order in which the participants contributing the highest number of messages are presented first and the participants having the fewest number of message contributions are listed last. The participants names can also be presented in chronological order of date/time of sending messages. For example, the participant that sent the most recent message (newest message) is listed first. The participant that sent the oldest message (greatest amount of time since last message sent) is listed last. Likewise, messages can be listed with oldest first and newest messages last. The participants can be listed in any other user-selected or default order. In some examples, an administrator can choose to fix some of the summary options, such as the order, annotations options, formatting options, and any other options, as defaults for all users.

In one example, the set of annotations 514 also include per-participant contributions 516. A per-participant contribution 516 can include a listing of the top contributor 518 authoring/sending the most messages, a percentage 520 of messages authored or sent by each participant and/or a number count 522 of messages in the thread sent by each participant.

The summary 116 in this example is displayed on a display device 524. The display device 524 may be implemented as any type of device for displaying or outputting data to a user. In some examples, the display device 524 is a display on a user device, such as, but not limited to, the user device 102 in FIG. 1. The display device 524 in other examples may be implemented as a touch screen, a liquid crystal display (LCD) screen, a monitor, a projected image, an augmented reality display device, or any other type of display device.

Figure 6:
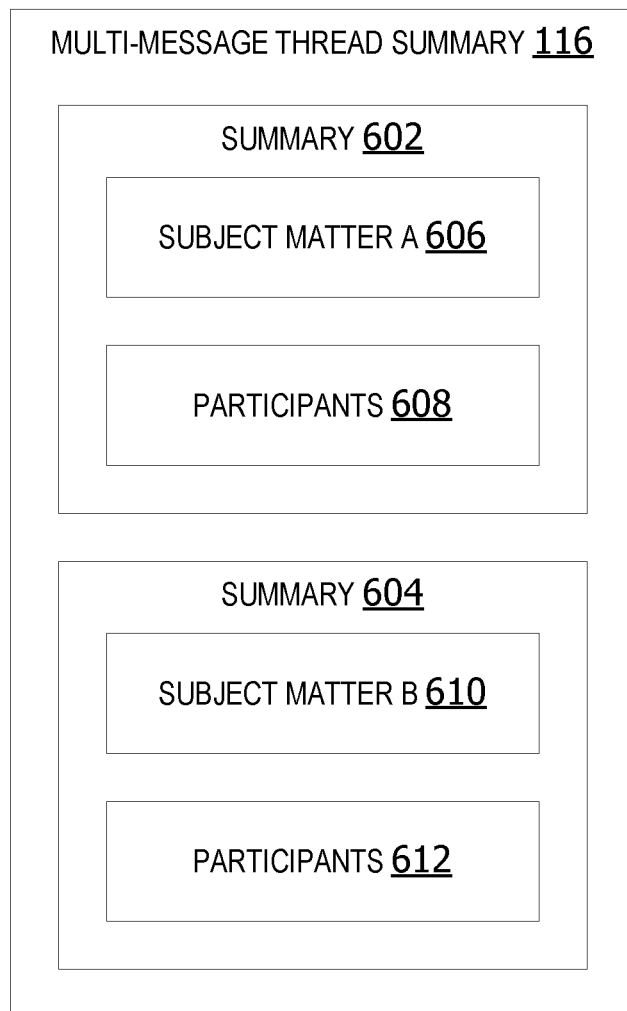
FIG. 6 is an exemplary block diagram illustrating a multi-message thread summary.

FIG. 6 is an exemplary block diagram illustrating a multi-message thread summary 116 including multiple summaries for a single message thread. In this example, a first summary 602 and a second summary 604 provide summaries for different portions of the message thread. The first summary 602 includes a summary 606 of a first set of messages associated with subject matter A and a list of participants 608 contributing messages to the first set of messages. The summary 604 includes a summary of the contents of a second set of messages associated with subject matter B 610 and a list of participants 612 contributing to the second set of messages.

In one example, if a multi-message thread associated with making lunch plans for a large group consists of messages associated with a variety of types of restaurants suggested by the participants, the first summary 602 can include messages associated with messages discussing Italian food restaurants and the second summary 604 can include a summarization of the messages associated with discussion of Mexican food restaurants options for the lunch.

In another example, as a conversation changes in real-time, the content of the summary is updated to reflect those changes. For example, if a conversation begins by focusing on a first possible solution or approach to a problem, the summary reflects this by focusing the summary on summarizations of messages associated with the first solution. If the conversation shifts, such that the conversation is now focused on a different second solution, the summary is likewise updated to reflect this change. In one example, the summarizations of the messages focusing on the first solution may be pruned or reduced/minimized, while new summarization associated with messaging discussing the second solution are added to reflect the new direction or focus of the conversation dynamically in real-time as new messages are being received.

In another example, if a thread includes one hundred messages in which approximately fifty messages discuss a first solution and fifty messages discuss a second solution, the clustering algorithm may produce two distinct clustering meshes associated with the two different solutions. In this case, the system can product a single summary focusing on whichever of the two solutions appear to be most favored when the last message is received or the solution having the greatest number of participants in agreement (solution having most support).

In still other examples, the summary can focus on the solution which appears to have the most support, while optionally including a nested summary for the other solution. If the user wants additional details about the solution associated with the nested summary, the user clicks on the nested summary to open it and see the full summary sentences and annotations. The nested summary can optionally include one or more other additional nested summaries In an example scenario, a summary focusing on summarization of a majority supported first solution can include a nested summary summarizing less favored second solution and third solution. Within the first nested summary of the disfavored solutions, a second nested summary providing a more detailed summarization of the second solution and a third nested summary providing additional details summarizing the third disfavored solution can be provided. These nested summaries are not displayed in full unless the user selects one or more of the nested summaries for expansion (display).

In still other examples, the summary can optionally include multiple sub-summaries summaries a subset of the messages in the multi-message thread. For example, a first sub-summary can summarize a first set of messages in the multi-message thread while a second sub-summary summarizes a second set of messages in the same multi-message thread. In an example scenario, if a multi-message thread includes 100 messages, a first sub-message summarizes 50 of the messages and a second sub-message summarizes the other 50 messages.

Unlike the nested summaries, the sub-summaries may be displayed in full as complete summaries within the summary pane when the summary icon for the multi-message thread is selected. In other examples, the user can customize the summary options such that only the sub-summary for the most recent set of messages is displayed unless the user selects the sub-summary for the older message or selects to view both (all) the sub-summaries for the entire multi-message thread. In this manner, the summary for a very long message thread is more concise and manageable while giving the user the option to customize the summarization format.

Figure 7:
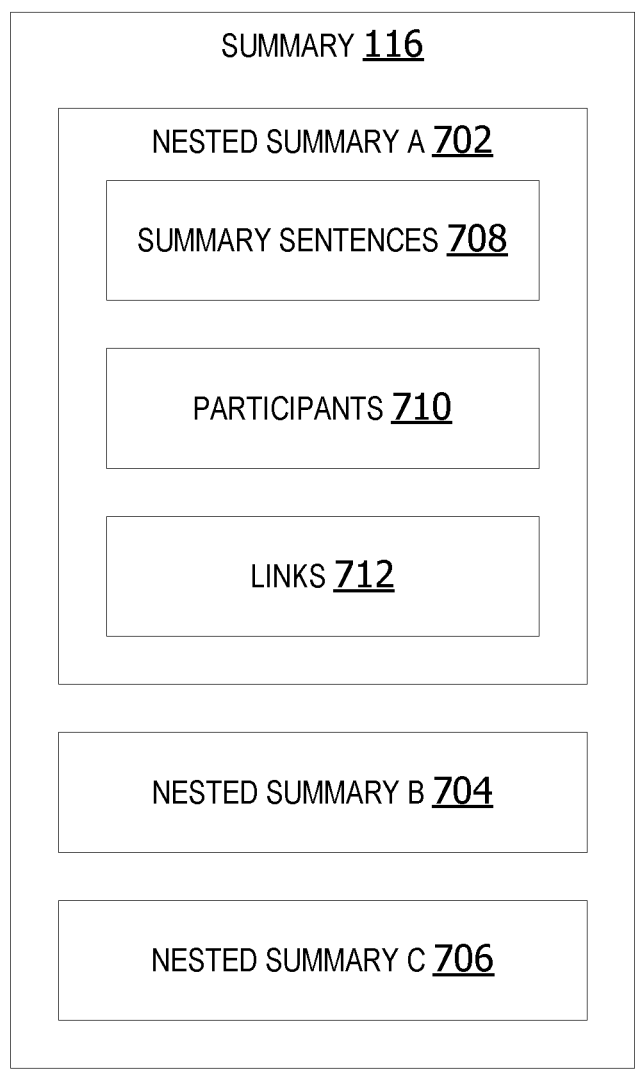
FIG. 7 is an exemplary block diagram illustrating a set of nested summaries associated with a multi-message conversation thread.

FIG. 7 is an exemplary block diagram illustrating a set of nested summaries associated with a multi-message conversation thread. In this example, the summary 116 includes a first nested summary 702, a second nested summary 704 and a third nested summary 706. Each nested summary covers a subset of the messages in the multi-message conversation thread. If the user selects the first nested summary 702, the nested summary 702 contents are displayed to the user. The nested summary 702 includes summary sentences 708, a set of participants 710 and/or a set of links 712 back to the original messages.

Figure 8:
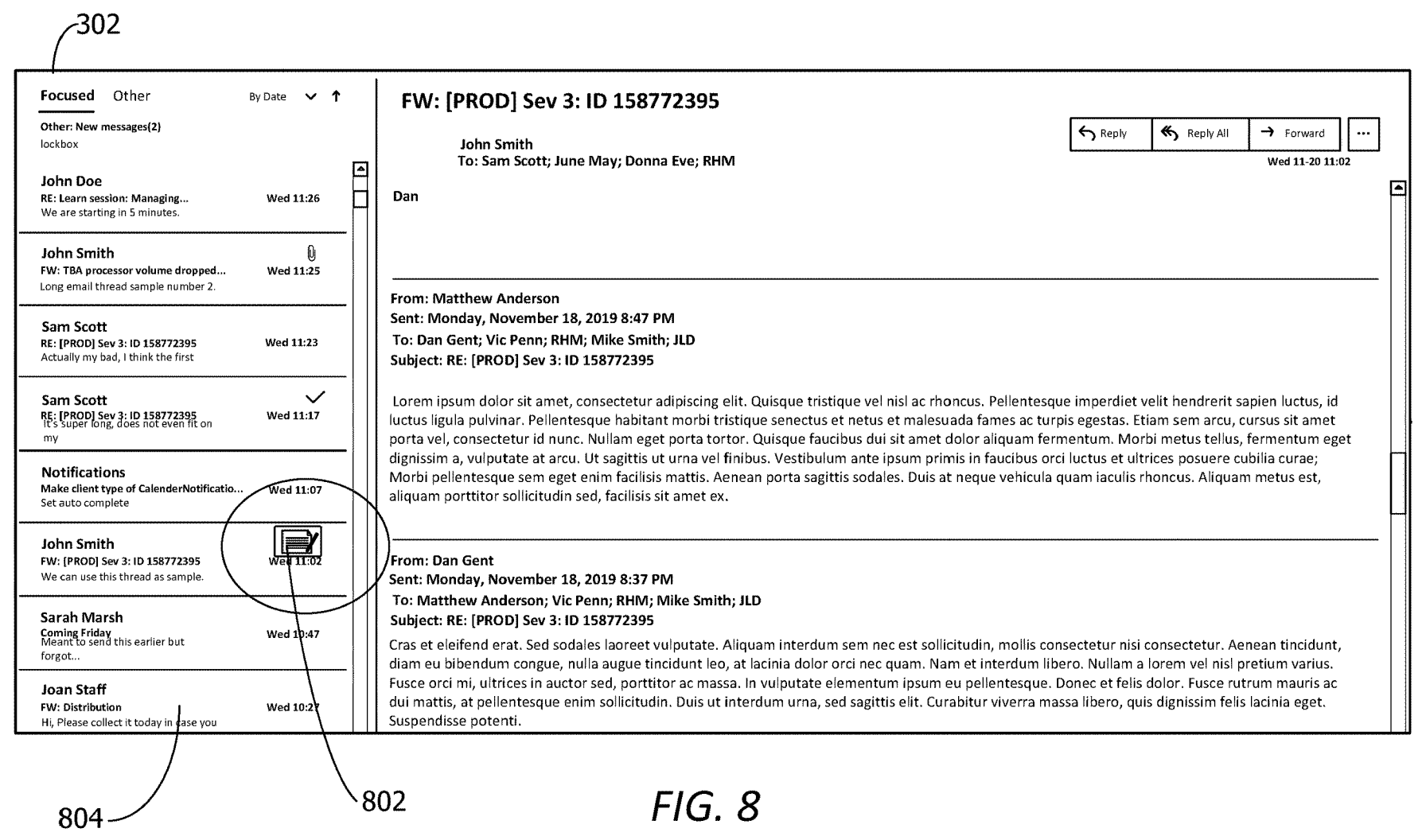

FIG. 8 is an exemplary block diagram illustrating a summary icon associated with a multi-message conversation thread. The GUI includes a summary icon 802 appended to an email listing in a message list panel.

Figure 9:
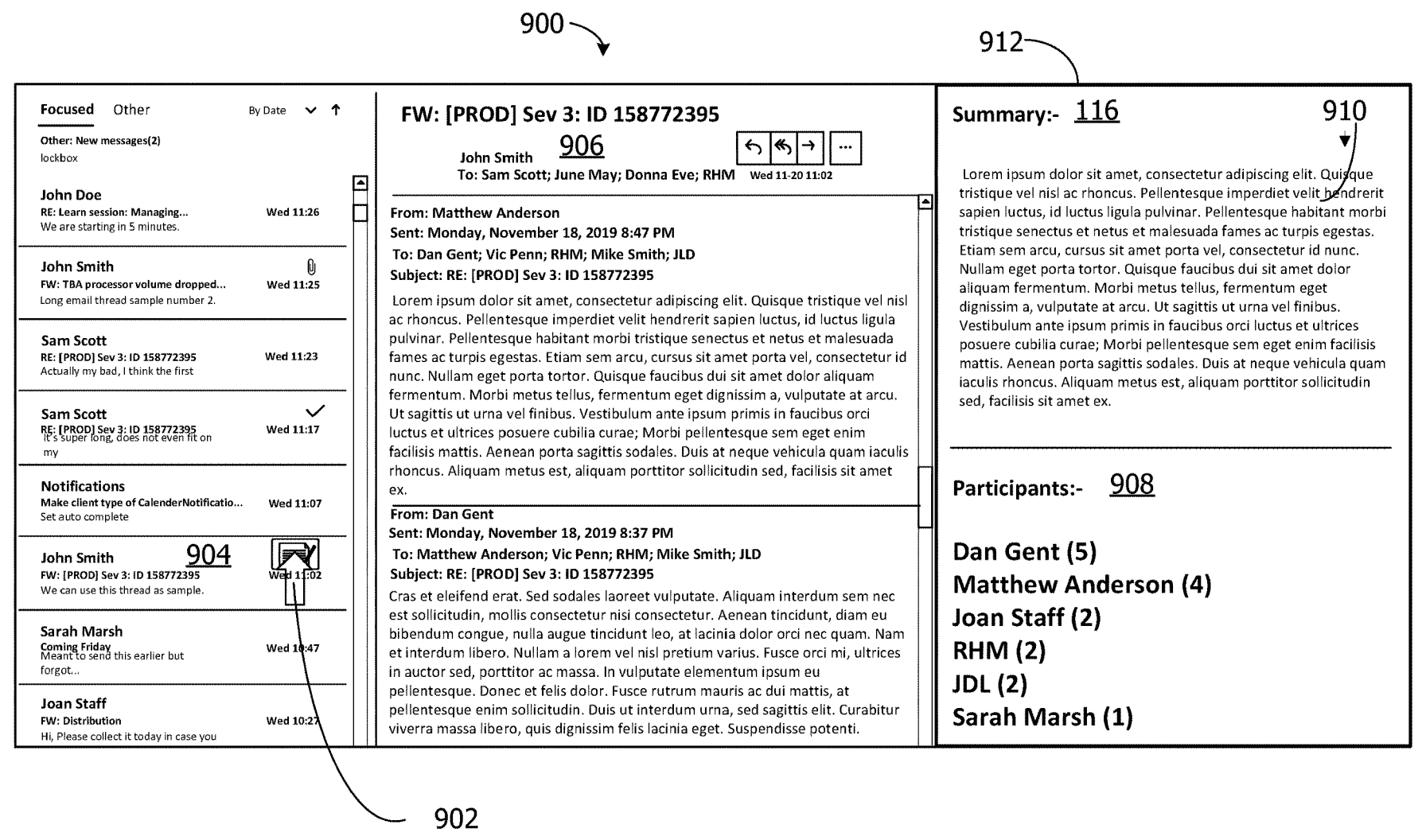

FIG. 9 is an exemplary block diagram illustrating a summary 116 associated with a selected message thread. The email display page 900 in this example includes a summary icon for each email thread listing including a number of emails exceeding a threshold number. If the user selects an icon 902 associated with a message listing 904 in a message list panel. The contents of the selected message are displayed in the message display panel 906. The summary sentences 910 for the summary are displayed in the summary display panel 912. The annotations include a list of participants 908 contributing to the emails.

FIG. 10 is an exemplary block diagram illustrating a set of user-configurable option for customizing a summary A configurations page 1000 in this page includes an option for a user to configure the format for the summary data presentation to the user. The user can configure the system to display a summary title, display summaries for messages satisfying certain criteria, choose the fit for the displayed information, activate, or deactivate the hover on sender's name feature, etc. In some examples, the user can choose to configure the system to generate summaries of messages from selected senders, messages associated with selected subjects, etc. In other words, the user can configure the system to always generate summaries of messages from selected users and/or generates summaries having certain keywords in the subject line of the emails.

FIG. 11 is an exemplary block diagram illustrating a hover on option. The summary display panel 1100 in this example includes a hover on sender's name option activated to display the name 1102 of a sender of a message. If the user hover's the cursor, mouse, or other input device over a summary sentence, the hover on sender's name option displays the name of the user that generated the original email upon which the summary sentence is derived.

Figure 12:
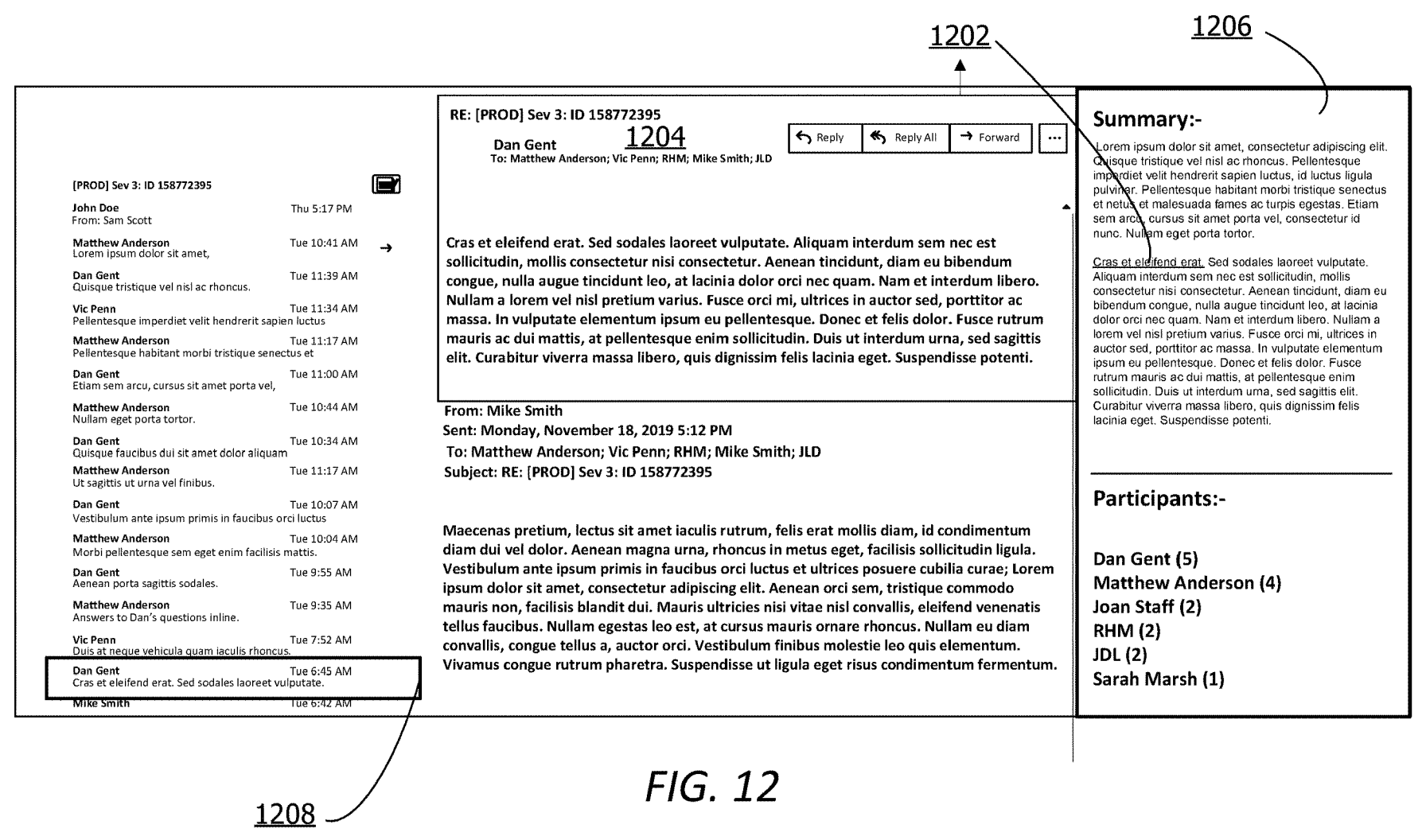

FIG. 12 is an exemplary block diagram illustrating a link 1202 back to a source message 1204 in a multi-message thread associated with a multi-message conversation thread listing 1208. When the user selects the link 1202 associated with a summary sentence in the summary 1206, the system displays the contents of the source message (original email) 1204 in the message display panel.

Figure 13:
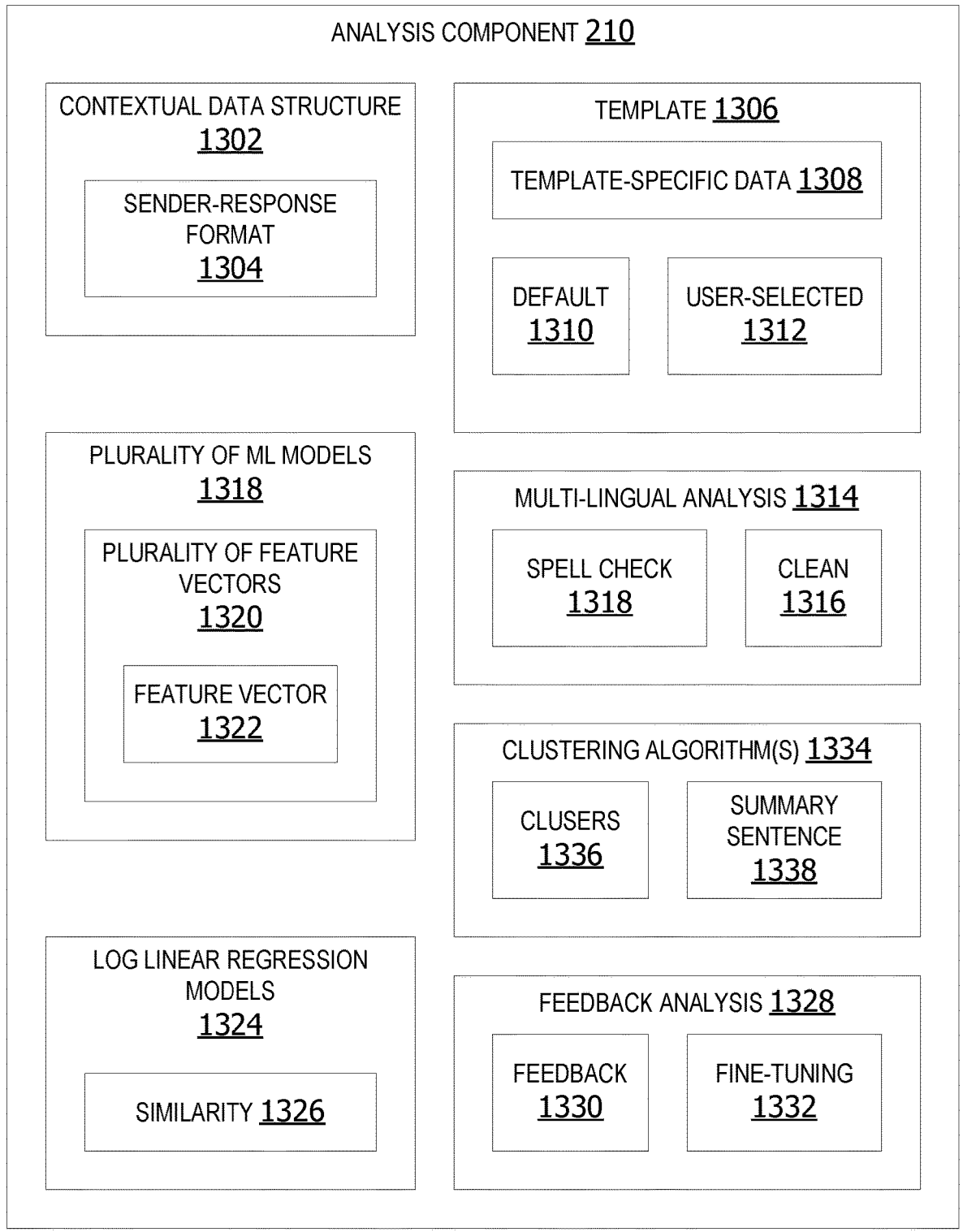
FIG. 13 is an exemplary block diagram illustrating an analysis component for generating summaries.

FIG. 13 is an exemplary block diagram illustrating an analysis component 210 for generating summaries. The system populates a contextual data structure 1302 with conversation participants and participation count. In some examples, the conversation thread data is converted into a single contextual data structure in a sender-response format 1304 to identify the sender and receiver of each message in the thread, including a number of replies to each message and a number of responses (replies) from each user. Converting the thread into single contextual data structure enables the machine learning (ML) models to process, analyze, and ultimately generate summary.

In other examples, the data is extracted from the messages in accordance with a template 1306. Template-specific data 1308 is obtained for utilization in formatting the summary in accordance with a default 1310 format or a user-selected 1312 format.

A multi-lingual analysis 1314 is performed to clean 1316 the data. The language associated with the message is identified. Language analysis can include identifying both the language and the dialect. Different languages and dialects may have varying spelling for the same words. For example, some words may have alternative spellings in American English versus British English. Cleaning the data can include, for example but without limitation, correcting spelling, fixing grammar, etc. The language analysis and spell check analysis are performed to normalize messages into a single summary single language document for feature vector analysis.

A plurality of ML models 1318 analyzes the cleaned and normalized conversation data to generate a plurality of feature vectors 1320 for comparative analysis. Each feature vector 1322 represents a different feature of the message data. In other examples, a different ML model is run for each of the various features, such as, but not limited to, sentiment value, length of sentence, sentiment score, type of sentence (question, declarative sentence, imperative sentence), context, etc. Different ML models generate different values representing different features of the sentences. The vectors from the various ML models are combined to form a feature vector representing each message for comparison to determine what each sentence means between different users. The ML models can optionally also include principal component analysis (PCA) and other models to generate feature vectors representing each sentence. A classifier may be applied against vectors.

Loglinear regression models 1324 are optionally run to identify similarity (Si) 1326 and relationships between message sentences. The analysis results are utilized to generate the summaries. The feature vectors are fed into clustering algorithms 1334.

One or more clustering algorithm(s) 1334 are utilized in still other examples to cluster similar sentences. All sentences in a conversation which talk about the same or similar subject matter, topic, and/or keyword(s) is part of same cluster. In some examples, similarity clusters change based on how the conversation (message content) is changing in real time. However, the examples are not limited to adjusting/updating the similarity clusters in real-time. In other examples, similarity clusters are only changed based on user input (feedback) to reduce costs.

Clustering identifies contextual changes in a conversation and identifies links between clusters and cluster edges. Clusters identify similar sentences. Clusters for similar sentences are linked in a mesh. An edge back or not connected to another cluster is given less weight but still utilizes as part of the summary Connected clusters are more closely related and given greater weight.

The weights applied to the clusters changes based on the final or direction of the conversation. As a conversation dynamically changes from a topic or solution A to a different solution B and then back to the original solution A, the weights applied to each cluster or mesh of clusters changes based on the contextual analysis.

Clusters forming during a first part of a conversation focused on a first solution to a problem forms related, inter-connected clusters. If the direction of the conversation changes, as a different, second solution to the problem is raised for discussion, new clusters which are not interconnected with the previous clusters begin forming. The clusters 1336 are utilized to generate summary sentences, such as, but not limited to, the summary sentence 1338.

In the example above, if the conversation turns to the second solution and the first solution appears to be abandoned or given minimal attention, the final summary content likewise focuses on messages associated with the second solution. For example, ninety percent of the summary may be focused on messages associated with the second solution while only ten percent of the summary includes content associated with the first solution.

In another example, the summary summarizing messages associated with the first solution (first set of clusters) and a second summary summarizing messages associated with the second solution (second set of clusters).

Feedback analysis 1328 may be utilized for fine-tuning 1332 the analysis. In some examples, user-provided feedback 1330 is analyzed to adjust weights applied to the data and/or ML model feature vectors to improve the accuracy of the generated summaries.

In an example, a user views a summary and the annotations. The user provides feedback regarding the quality and/or accuracy of the summary and annotations. The feedback can also indicate features or options the user liked or did not like while viewing the summary. The feedback is used by the system to train and fine-tune summary generation. The feedback loop is used to refine ML models used to generate the feature vectors.

Thus, in some examples, the system provides multi-lingual semantic analysis of conversations to generate dynamic conversation summaries using metadata and annotations. Feature vectors representing sentences within messages are generated by ML models used to identify features and compute similarities between message sentences. The data is fed into clustering algorithms to create clusters. The clustering is used to generate summaries. User-provided feedback is optionally used to fine-tune the ML models.

Figure 14:
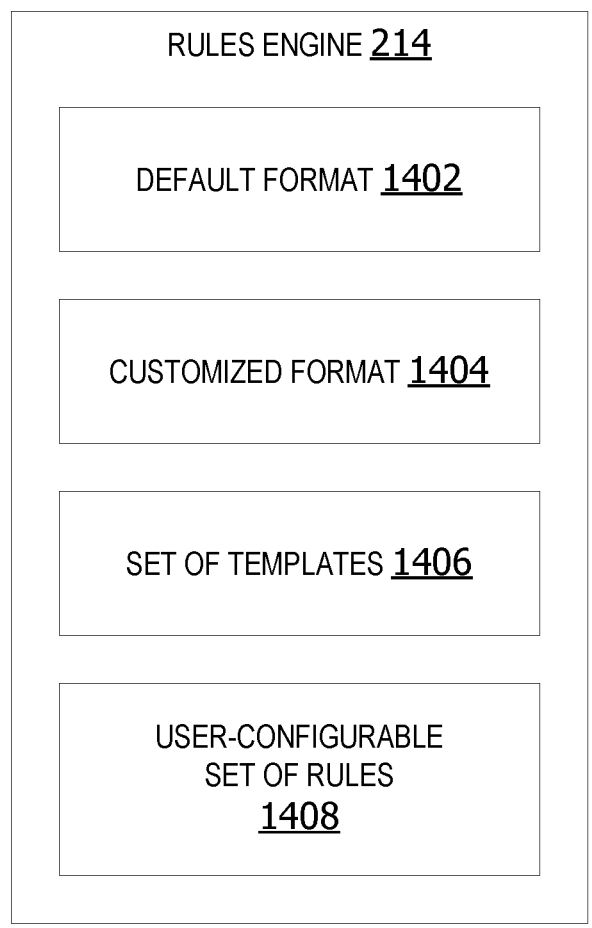
FIG. 14 is an exemplary block diagram illustrating a rules engine for generating customized summaries.

FIG. 14 is an exemplary block diagram illustrating a rules engine 214 for generating customized summaries. The rules engine 214 applies default rules and user-configured rules for generating summaries. The rules engine 214 in some examples includes a default format 1402 for formatting summary data. A user can select or create a customized format 1404 for generating summaries.

The user-configurable set of rules 1408 in some examples includes one or more user-selected rules for generating the summaries. A user can specify subject matter of messages to be summarized, message from selected senders to be summarized or other rules. The user-configurable rules are utilized to generate customizable conversation summaries providing summaries of multi-message conversation threads. The rules are utilized to customize settings for selecting summary options, such as, but not limited to, listing all participants, number of responses/replies and annotated content. The user can select from user-configurable templates/customizable summary format to customize summary features, turn on the "hover on sender name" option to obtain name of user contributing to a sentence included in summary, select a template from a set of templates 1406, set parameters for multiple summaries/nested summaries in long conversations, activate link back to original emails where user clicks on a sentence in summary and/or customize data format in real-time updates of summaries based on changes in conversation direction.

Figure 15:
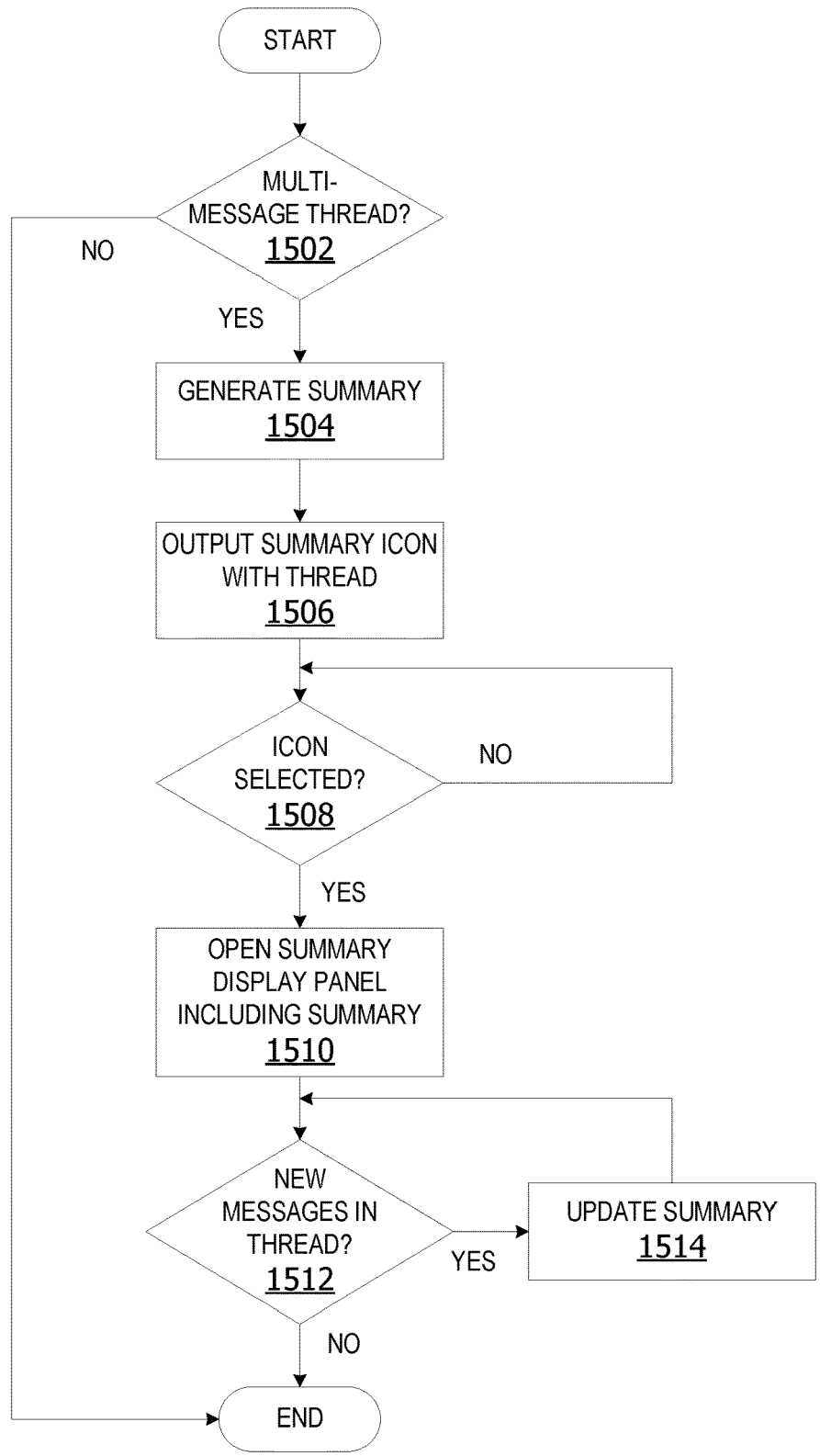
FIG. 15 is an exemplary flow chart illustrating operation of the computing device to create multi-message conversation thread summaries.

FIG. 15 is an exemplary flow chart illustrating operation of the computing device to create multi-message conversation thread summaries. The process shown in FIG. 15 is performed by a customizable message summary component, executing on a computing device, such as the computing device 2000 of FIG. 20.

The process begins by determining whether a multi-message conversation thread is present at 1502. If yes, the customizable message summary component generates a summary at 1504. A summary icon is output with the thread at 1506. A determination is made whether the icon is selected by a user at 1508. A user can select the icon by clicking a mouse, touching the icon on a touch screen, or any other method for selecting a graphical icon. If the icon is selected, the summary display panel including the generated summary is opened at 1510. A determination is made whether any new message is received in the thread at 1512. If yes, the summary is updated at 1514. The update can include any new participants joining the thread, updated response count for a participant, updated summary sentences to reflect changes in the direction of the conversation, etc. When a new user joins the message thread, the list of participants is also updated. Likewise, as the focus of the conversation or discussion shifts and changes, the contextual analysis and weights applied to the vector analysis and clustering algorithms change to reflect the current direction of the conversation between users. The contents of the summary and focus of the summary is updated in real-time to reflect these changes. If no new messages in the thread are received at 1512, the process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

Figure 16:
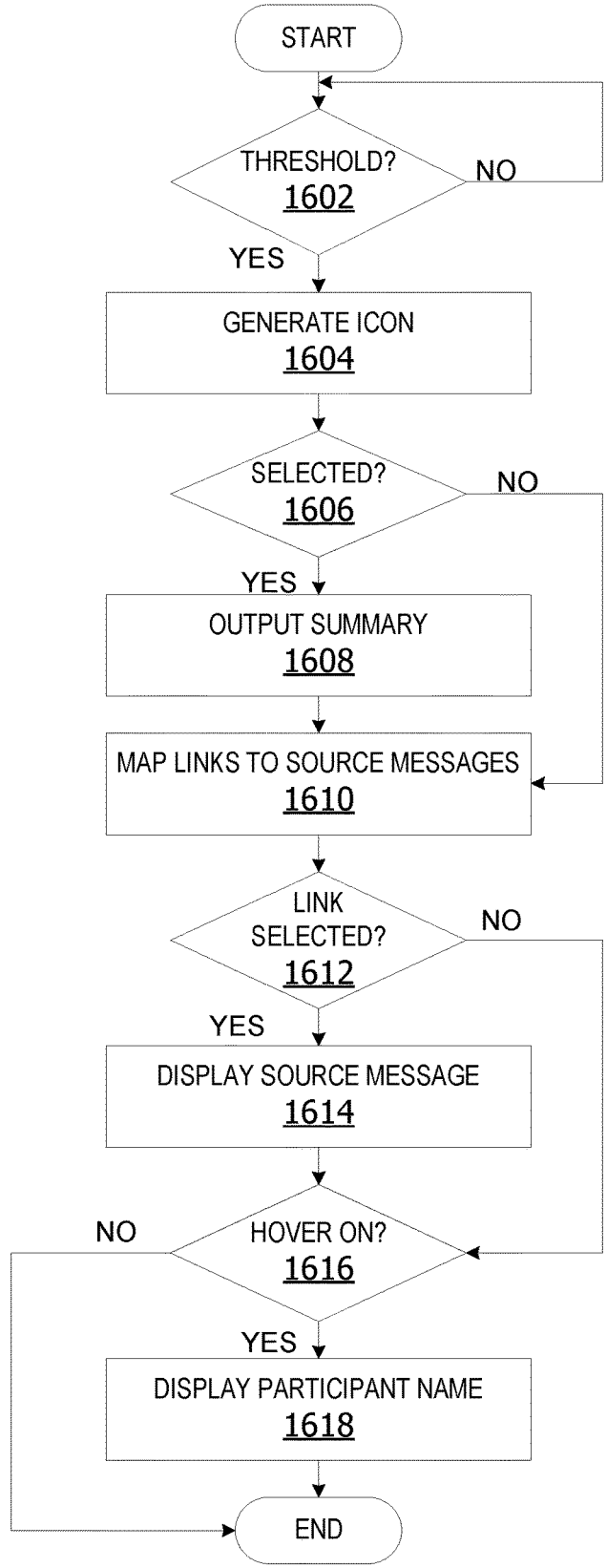
FIG. 16 is an exemplary flow chart illustrating operation of the computing device to provide dynamic multi-message conversation thread summaries.

FIG. 16 is an exemplary flow chart illustrating operation of the computing device to provide dynamic multi-message conversation thread summaries. The process shown in FIG. 15 is performed by a customizable message summary component, executing on a computing device, such as the computing device 2000 of FIG. 20.

The process begins by determining if a threshold number of messages is received within a multi-message conversation thread at 1602. If yes, a summary icon is generated at 1604. The summary icon is presented to the user via the user interface, such as a display. A determination is made whether the icon is selected at 1606. If yes, the summary is output in a summary display pane at 1608. One or more links are mapped to one or more source messages at 1610. A determination is made whether a link is selected at 1612. If yes, the source message associated with the link is displayed at 1614. A determination is made whether a hover on sender's name option is activated at 1616. The hover on sender's name option can be activated by allowing the curser or mouse to hover over a summary sentence in the summary. If yes, the name of the participant that authored the source message on which the summary sentence is based is displayed at 1618. The process terminates thereafter.

While the operations illustrated in FIG. 16 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 16.

Figure 17:
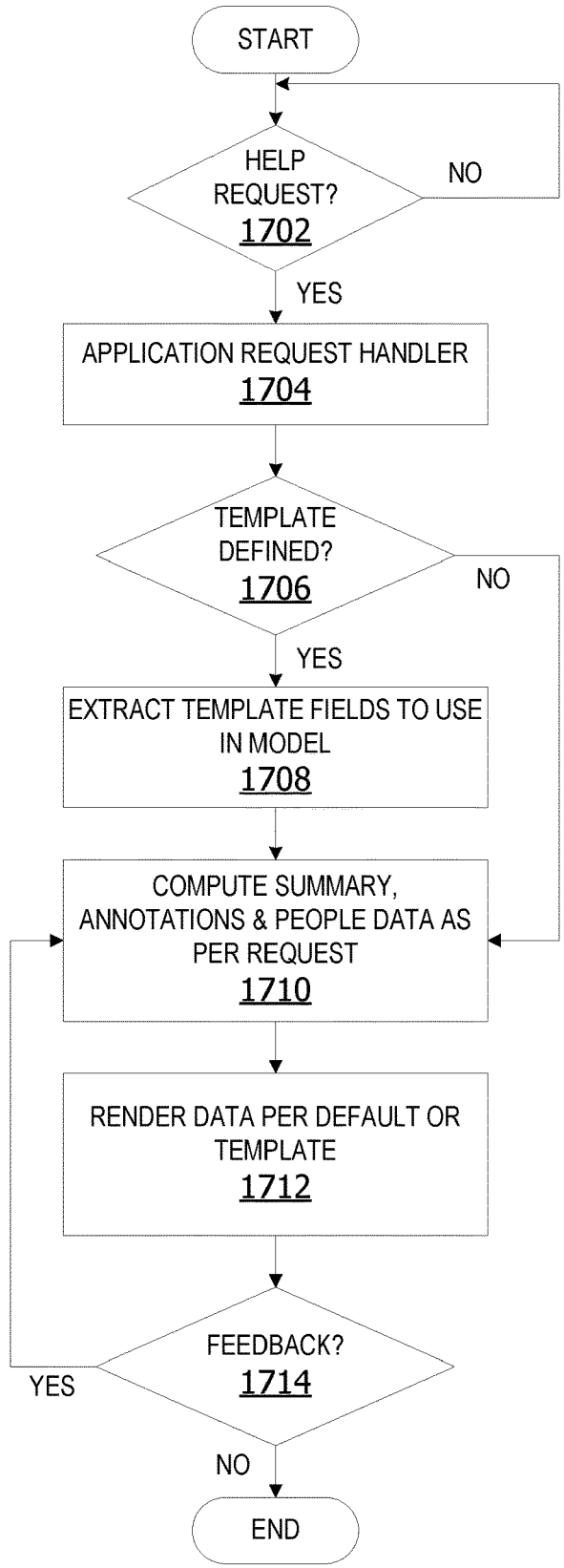
FIG. 17 is an exemplary flow chart illustrating operation of the computing device to generate multi-message summaries including annotations.

FIG. 17 is an exemplary flow chart illustrating operation of the computing device to generate multi-message summaries including annotations. The process shown in FIG. 17 is performed by a customizable message summary component, executing on a computing device, such as the computing device 2000 of FIG. 20.

A determination is made whether summary help is requested at 1702. If yes, an application request handler is activated at 1704. A determination is made whether the template is defined at 1706. If yes, the template fields are extracted to use in a model at 1708. A summary, annotations and people data are computed as per the request at 1710. The data is rendered according to default settings or according to the user-selected template at 1712. A determination is made whether feedback is received at 1714. If yes, the feedback is used to fine-tune the process for computing the summary, annotations, and people (participant) data. If no feedback is received at 1714, the process terminates thereafter.

While the operations illustrated in FIG. 17 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 17.

Figure 18:
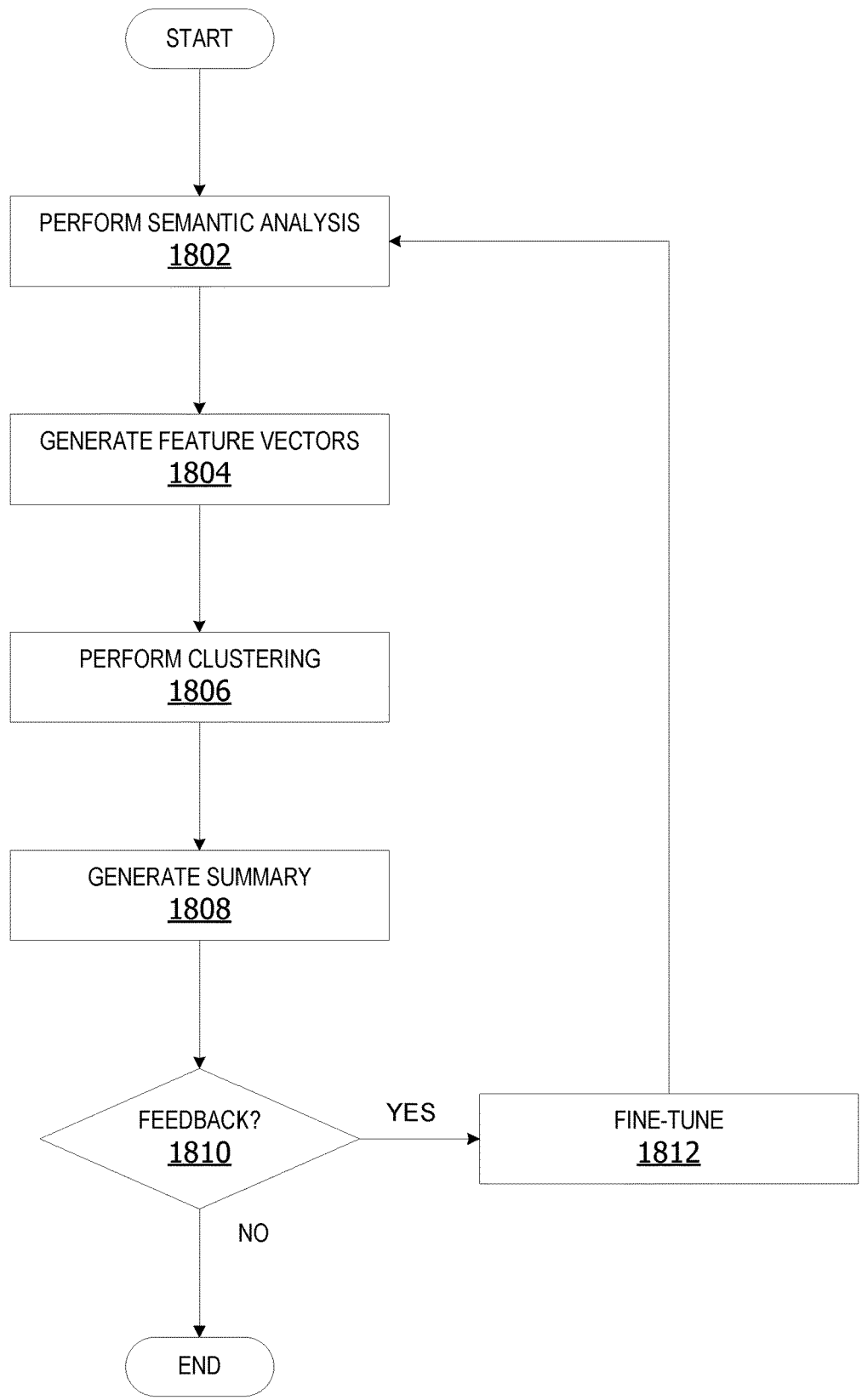
FIG. 18 is an exemplary flow chart illustrating operation of the computing device to analyze messages in a thread for summarization.

FIG. 18 is an exemplary flow chart illustrating operation of the computing device to analyze messages in a thread for summarization. The process shown in FIG. 15 is performed by a customizable message summary component, executing on a computing device, such as the computing device 2000 of FIG. 20.

The process begins by performing semantic analysis at 1802. Feature vectors representing the message contents are generated at 1804. Clustering is performed at 1806. A summary of the messages is generated at 1808. A determination is made whether user feedback is received at 1810. If yes, the feedback is used to fine-tune the ML models used to generate the feature vectors at 1812 to improve the quality and accuracy of the summaries. If no, feedback is provided at 1810, the process terminates thereafter.

While the operations illustrated in FIG. 18 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 18.

Figure 19:
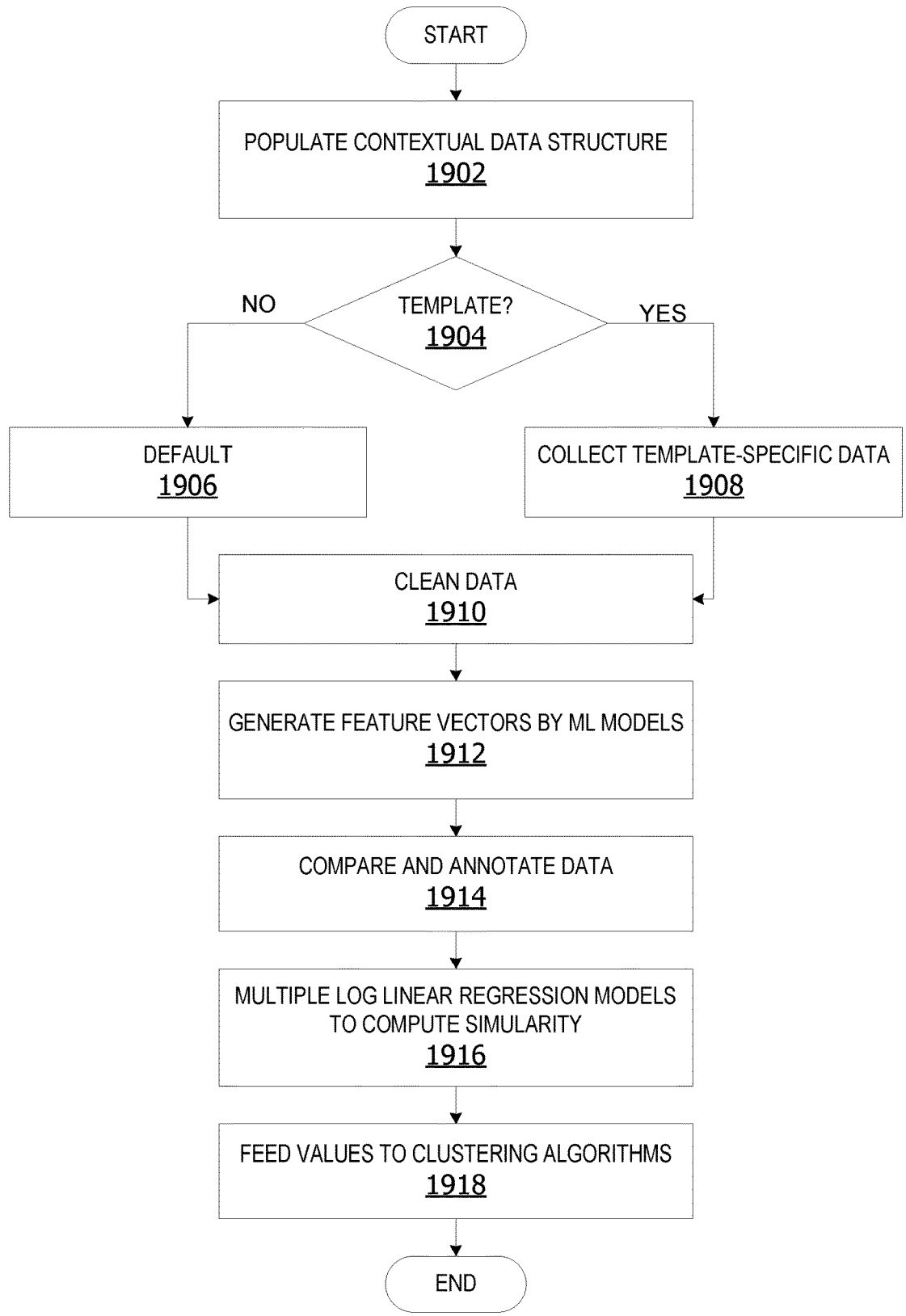
FIG. 19 is an exemplary flow chart illustrating operation of the computing device to perform multi-lingual analysis of messages for summarization.

FIG. 19 is an exemplary flow chart illustrating operation of the computing device to perform multi-lingual analysis of messages for summarization. The process shown in FIG. 15 is performed by a customizable message summary component, executing on a computing device, such as the computing device 2000 of FIG. 20.

The process begins by populating contextual data structure at 1902. A determination is made whether a template is selected at 1904. If no, default settings are used at 1906. If a template is selected, template-specific data is collected at 1908. The data is cleaned at 1910. Cleaning the data includes proofreading to correct spelling and grammar Feature vectors are generated by ML models at 1912. A similarity comparison is performed and the message data is annotated at 1914. Multiple loglinear regression models are used to compute similarity (Si) between message sentences at 1916. The values are fed into clustering algorithms at 1918 for utilization in generating summary sentences. The process terminates thereafter.

While the operations illustrated in FIG. 19 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 19.

ADDITIONAL EXAMPLES

Some aspects and examples disclosed herein are directed to a system, method and/or computer executable instructions for generating customizable multi-message conversation thread summaries: a processor; and a computer-readable medium storing instructions that are operative upon execution by the processor to: present, by a user interface device, a summary icon associated with a multi-message conversation listing representing a multi-message conversation thread within a message list panel in response to a number of messages in the multi-message conversation thread exceeding a threshold number of messages; create, by a customizable message summary component, a summary of a plurality of messages in the multi-message conversation thread, the summary comprising a set of participants contributing at least one message in the plurality of messages and a set of summary sentences summarizing contents of a set of source messages in the plurality of messages; and map, by a set of links, the set of summary sentences to the set of source messages, wherein activation of a link in the set of links associated with a summary sentence in the set of summary sentences triggers display of at least a portion of at least one source message in the set of source messages from which at least a portion of the content of the summary sentence is derived.

Additional aspects and examples disclosed herein are directed to a system, method, or computer executable instructions for generating, by an icon manager component, a summary icon associated with a multi-message conversation listing representing a multi-message conversation thread within a message list panel having a number of messages in the multi-message conversation thread exceeding a threshold number of messages; creating, by an analysis component, a summary of a plurality of messages in the multi-message conversation thread in response to a selection of the summary icon, the summary comprising a set of participants contributing at least one message in the plurality of messages and a set of summary sentences summarizing contents of a set of source messages in the plurality of messages; displaying, by a user interface, the summary within a summary display panel in response to a selection of the summary icon; mapping, by a mapping component, a set of links associated with the set of summary sentences to a set of source messages; and displaying a source message in the set of source messages within a message display panel of the user interface in response to activation of a link in the set of links associated with a summary sentence in the set of summary sentences, wherein the source message is a message from which at least a portion of the content of the summary sentence is derived.

Additional aspects and examples disclosed herein are directed to a system, method and/or one or more computer storage devices having computer-executable instructions stored thereon for presenting, by a display device, a summary icon associated with a multi-message conversation listing representing a multi-message conversation thread within a message list panel in response to a number of messages in the multi-message conversation thread exceeding a threshold number of messages; creating, by a customizable message summary component, a summary of a plurality of messages in the multi-message conversation thread, the summary comprising a set of participants contributing at least one message in the plurality of messages and a set of summary sentences summarizing contents of a set of source messages in the plurality of messages; and mapping, by a set of links, the set of summary sentences to the set of source messages, wherein activation of a link in the set of links associated with a summary sentence in the set of summary sentences triggers display of at least a portion of at least one source message in the set of source messages from which at least a portion of the content of the summary sentence is derived.

In some examples, when looking at an email conversation with a configurable number (n) of messages, a new button is shown on the top of the conversation. If the users click this option, the user is shown a summary of the entire conversation. All the participants in the conversation are also shown in the bottom part. The participants name is annotated with the number of replies each participant has sent in this conversation. Other annotations which are optionally provided in the summary include sentiment of the sender, which can be added.

In an exemplary scenario, the system provides the option to see a summary of a mail conversation along with customizable templates for the summary and multiple annotations and features. The summary is context-aware, each feature (sentence) chosen for inclusion in the summary having various annotations which makes a rich experience.

In an example scenario, the multi-message conversation thread summary includes a list of all users that authored a message (email) indicating the author/user agreed to a decision, link to the message (email) from the sentence which contributed to the sentence in the summary, top participants in the conversation, and so on.

In another example, users see a summary icon on every email thread which has more than "X" number of messages. After clicking on the summary icon, a new smart panel on the right side of the email content opens which contains a summary of the entire conversation, followed by all participants annotated with the number of emails they have sent in the thread.

The summary in other examples is heavily annotated with context. If the user has chosen the option of 'On Hover Sender Name', then the name of the user who contributed to the sentence/sentiment shown in the smart summary when the mouse hovers on top of a statement in the summary Clicking on a sentence in the summary expands and opens the specific individual email in the thread which contributed to the sentence in the summary.

Alternatively, or in addition to the other examples described herein, examples include any combination of the following:

- a user-configurable template in a set of templates selected by a user, wherein data associated with the summary is presented to the user in a customizable summary format corresponding to the selected user-configurable template;
- a hover sender name option associated with at least one summary sentence in the set of summary sentences, wherein activation of the hover sender name option triggers display of at least one name of a participant in the plurality of participants that sent at least one source message providing at least a portion of the content to the summary sentence;
- a first count value associated with a first identifier of a first participant, the first count value indicating a number of messages within the plurality of messages authored by the first participant; and
- a second count value associated with a second identifier of a second participant, the first count value indicating a number of messages within the plurality of messages authored by the second participant;
- a first link associated with a first sentence in the set of summary sentences linked to a first source message in the multi-message conversation thread, wherein selection of the first link triggers display of at least a portion of contents of the first source message;
- a second link associated with a second sentence in the set of summary sentences linked to a second source message in the multi-message conversation thread, wherein selection of the second link triggers display of at least a portion of contents of the second source message;
- a first nested summary summarizing contents of a first set of messages in the plurality of messages, wherein selection of the second nested summary triggers display of a first set of summary sentences, a first set of participants contributing one or more messages in the first set of messages and a first per-participant response count indicating a first per-participant response count indicating a number of messages in the first set of messages contributed by each participant in the first set of participants;
- a second nested summary summarizing contents of a second set of messages in the plurality of messages, wherein selection of the second nested summary triggers display of a second set of summary sentences, a second set of participants contributing at least one message in the second set of messages and a second per-participant response count indicating a number of messages in the second set of messages contributed by each participant in the second set of participants;
- wherein the summary is a first summary of a first set of messages in the plurality of messages associated with a first subject-matter within the multi-message conversation, the first summary comprising a first set of summary sentences and a first set of participants;
- a second summary of a second set of messages in the plurality of messages associated with a second subject-matter within the multi-message conversation, the second summary comprising a second set of summary sentences and a second set of participants;
- update, within a summary display panel presented within a user interface device, the summary in real-time in response to receiving a set of new messages in the multi-message conversation;
- a set of annotations associated with the set of summary sentences displayed within a summary display panel, wherein the set of annotations comprises a per-participant response count indicating a number of messages in the plurality of messages contributed by each participant;
- presenting, by a display device, a summary icon associated with a multi-message conversation listing representing a multi-message conversation thread within a message list panel in response to a number of messages in the multi-message conversation thread exceeding a threshold number of messages;
- creating, by a customizable message summary component, a summary of a plurality of messages in the multi-message conversation thread, the summary comprising a set of participants contributing at least one message in the plurality of messages and a set of summary sentences summarizing contents of a set of source messages in the plurality of messages;
- mapping a set of links in the set of summary sentences to the set of source messages, wherein activation of a link in the set of links associated with a summary sentence in the set of summary sentences triggers display of at least a portion of at least one source message in the set of source messages from which at least a portion of the content of the summary sentence is derived;
- customizing presentation of the summary in accordance with a customizable summary format corresponding to a selected user-configurable template selected by a user;
- displaying an identifier associated with a participant contributing to at least one source message providing at least a portion of the content to the summary sentence in response to activation of a hover sender name option associated with at least one summary sentence in the set of summary sentences;
- creating a set of summaries, the set of summaries optionally including a first nested summary summarizing contents of a first set of messages in the plurality of messages and a second nested summary summarizing contents of a second set of messages in the plurality of messages;
- wherein the summary is a first summary of a first set of messages in the plurality of messages;
- wherein the summary is a first summary of a first set of messages in the plurality of messages associated with a first subject-matter within the multi-message conversation, the first summary comprising a first set of summary sentences and a first set of participants;
- creating a second summary of a second set of messages in the plurality of messages associated with a second subject-matter within the multi-message conversation, the second summary comprising a second set of summary sentences and a second set of participants;
- updating, within a summary display panel presented within a user interface device, the summary in real-time in response to receiving a set of new messages in the multi-message conversation;
- annotating the summary, wherein at least one annotation comprises a per-participant response count indicating a number of messages in the plurality of messages contributed by each participant;
- presenting a summary icon associated with a multi-message conversation in response to a number of messages in the multi-message conversation thread exceeding a threshold number of messages;

creating a summary of the multi-message conversation thread, including a listing of the participants contributing at least one message within the multi-message conversation thread and at least one summary sentence summarizing contents of the multi-message conversation thread;

displaying at least a portion of at least one source message in the multi-message conversation from which at least a portion of a summary sentence is derived in response to activation of a link associated with the summary sentence in the set of summary sentences;

customizing presentation of the summary in accordance with a customizable summary format corresponding to a selected user-configurable template selected by a user;

displaying an identifier associated with a participant contributing to at least one source message providing at least a portion of the content to the summary sentence in response to activation of a hover sender name option associated with at least one summary sentence in the set of summary sentences;

creating a set of nested summaries, the set of nested summaries comprising a first nested summary summarizing contents of a first set of messages in the plurality of messages and a second nested summary summarizing contents of a second set of messages in the plurality of messages;

updating, within a summary display panel presented within a user interface device, the summary in response to receiving at least one of a set of new messages in the multi-message conversation or user-provided feedback; and annotating the summary, wherein at least one annotation comprises a per-participant response count indicating a number of messages in the plurality of messages contributed by each participant.

While the aspects of the disclosure have been described in terms of various examples with their associated operations, a person skilled in the art would appreciate that a combination of operations from any number of different examples is also within scope of the aspects of the disclosure.

Example Operating Environment

Figure 20:
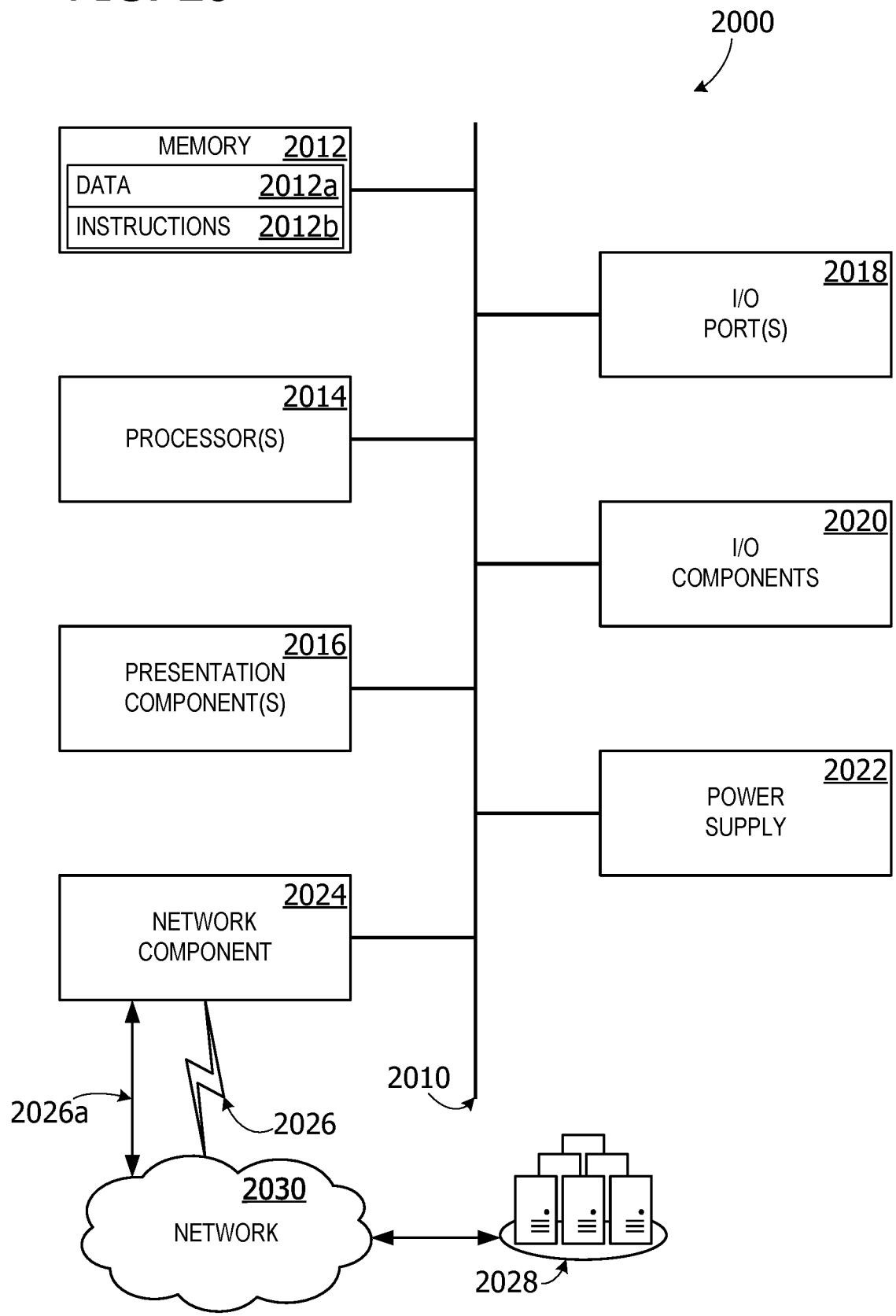
FIG. 20 is a block diagram of an example computing device 2000 for implementing aspects disclosed herein and is designated generally as computing device 2000.

FIG. 20 is a block diagram of an example computing device 2000 for implementing aspects disclosed herein and is designated generally as computing device 2000. Computing device 2000 is an example of a suitable computing environment and is not intended to suggest any limitation as to the scope of use or functionality of the examples disclosed herein. Neither should computing device 2000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 2000 includes a bus 2010 that directly or indirectly couples the following devices: computer-storage memory 2012, one or more processors 2014, one or more presentation components 2016, input/output (I/O) ports 2018, I/O components 2020, a power supply 2022, and a network component 2024. While computing device 2000 is depicted as a seemingly single device, multiple computing devices 2000 may work together and share the depicted device resources. For example, memory 2012 may be distributed across multiple devices, and processor(s) 2014 may be housed with different devices.

Bus 2010 represents what may be one or more busses (such as an address bus, data bus, or a combination thereof). Although the various blocks of FIG. 20 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 20 and the references herein to a "computing device." Memory 2012 may take the form of the computer-storage media references below and operatively provide storage of computer-readable instructions, data structures, program modules and other data for computing device 2000. In some examples, memory 2012 stores one or more of an operating system, a universal application platform, or other program modules and program data. Memory 2012 is thus able to store and access data 2012a and instructions 2012b that are executable by processor 2014 and configured to carry out the various operations disclosed herein.

In some examples, memory 2012 includes computer-storage media in the form of volatile and/or nonvolatile memory, removable or non-removable memory, data disks in virtual environments, or a combination thereof. Memory 2012 may include any quantity of memory associated with or accessible by computing device 2000. Memory 2012 may be internal to computing device 2000 (as shown in FIG. 20), external to computing device 2000 (not shown), or both (not shown). Examples of memory 2012 in include, without limitation, random access memory (RAM); read only memory (ROM); electronically erasable programmable read only memory (EEPROM); flash memory or other memory technologies; compact disk read-only memory (CD-ROM), digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 2000. Additionally, or alternatively, memory 2012 may be distributed across multiple computing devices 2000, for example, in a virtualized environment in which instruction processing is carried out on multiple computing devices 2000. For the purposes of this disclosure, "computer storage media," "computer-storage memory," "memory," and "memory devices" are synonymous terms for computer-storage memory 2012, and none of these terms include carrier waves or propagating signaling.

Processor(s) 2014 may include any quantity of processing units that read data from various entities, such as memory 2012 or I/O components 2020 and may include one or more CPUs and/or one or more graphics processor units (GPUs). Specifically, processor(s) 2014 are programmed to execute computer-executable instructions for implementing aspects of the disclosure. The instructions may be performed by the processor, by multiple processors within computing device 2000, or by a processor external to client computing device 2000. In some examples, processor(s) 2014 are programmed to execute instructions such as those illustrated in the in the accompanying drawings. Moreover, in some examples, processor(s) 2014 represent an implementation of analog techniques to perform the operations described herein. For example, the operations may be performed by an analog client computing device 2000 and/or a digital client computing device 2000. Presentation component(s) 2016 present data indications to a user or other device. Exemplary presentation components include a display device, speaker, printing component, vibrating component, etc. One skilled in the art will understand and appreciate that computer data may be presented in a number of ways, such as visually in a GUI, audibly through speakers, wirelessly between computing devices 2000, across a wired connection, or in other ways. I/O ports 2018 allow computing device 2000 to be logically coupled to other devices including I/O components 2020, some of which may be built in. Example I/O components 2020 include, for example but without limitation, a microphone, joystick, game pad, satellite dish, scanner, printer, wireless device, etc.

Computing device 2000 may operate in a networked environment via network component 2024 using logical connections to one or more remote computers. In some examples, network component 2024 includes a network interface card and/or computer-executable instructions (e.g., a driver) for operating the network interface card. Communication between computing device 2000 and other devices may occur using any protocol or mechanism over any wired or wireless connection. In some examples, network component 2024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 2024 communicates over wireless communication link 2026 and/or a wired communication link 2026a to a cloud resource 2028 across network 2030. Various different examples of communication links 2026 and 2026a include a wireless connection, a wired connection, and/or a dedicated link, and in some examples, at least a portion is routed through the internet.

Although described in connection with an example computing device 2000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for generating customized multi-message conversation summaries, the system comprising:
 a user interface device presenting a summary icon associated with a multi-message conversation listing representing a multi-message conversation thread within a message list panel in response to a number of messages in the multi-message conversation thread exceeding a threshold number of messages;
 a computer-readable medium storing instructions that are operative upon execution by a processor to:
  create, by a customizable message summary component, a summary of a plurality of messages in the multi-message conversation thread in response to activation of the summary icon, the summary comprising a set of participants contributing at least one message in the plurality of messages and a set of summary sentences summarizing contents of a set of source messages in the plurality of messages; and
  map, by a mapping component, a set of links associated with the set of summary sentences to the set of source messages, wherein activation of a link in the set of links associated with a summary sentence in the set of summary sentences triggers display of at least a portion of at least one source message in the set of source messages from which at least a portion of the contents of the summary sentence is derived.

2. The system of claim 1, further comprises:
 a user-configurable template in a set of templates selected by a user, wherein data associated with the summary is presented to the user in a customizable summary format corresponding to the user-configurable template.

3. The system of claim 1, further comprising:
 a hover sender name option associated with at least one summary sentence in the set of summary sentences, wherein activation of the hover sender name option triggers display of at least one name of a participant in the set of participants.

4. The system of claim 1, further comprising:
 a set of annotations associated with the set of summary sentences displayed within a summary display panel, wherein the set of annotations comprises:
  a first count value associated with a first identifier of a first participant, the first count value indicating a number of messages within the plurality of messages authored by the first participant; and
  a second count value associated with a second identifier of a second participant, the first count value indicating a number of messages within the plurality of messages authored by the second participant.

5. The system of claim 1, wherein the summary is a first summary of a first set of messages in the plurality of messages associated with a first subject-matter within the multi-message conversation thread, the first summary comprising a first set of summary sentences and a first set of participants, and further comprising:
 a second summary of a second set of messages in the plurality of messages associated with a second subject-matter within the multi-message conversation thread, the second summary comprising a second set of summary sentences and a second set of participants.

6. The system of claim 1, wherein the instructions are further operative to:
 update, within a summary display panel presented within a user interface device, the summary in real-time in response to receiving a set of new messages in the multi-message conversation thread.

7. The system of claim 1, wherein the set of links further comprises:
 a first link associated with a first sentence in the set of summary sentences linked to a first source message in the multi-message conversation thread, wherein selection of the first link triggers display of at least a portion of contents of the first source message; and
 a second link associated with a second sentence in the set of summary sentences linked to a second source message in the multi-message conversation thread, wherein selection of the second link triggers display of at least a portion of contents of the second source message.

8. A method of generating customized multi-message conversation summaries, the method comprising:
 generating, by an icon manager component, a summary icon associated with a multi-message conversation listing representing a multi-message conversation thread within a message list panel having a number of messages in the multi-message conversation thread exceeding a threshold number of messages;
 creating, by an analysis component, a summary of a plurality of messages in the multi-message conversation thread in response to a selection of the summary icon, the summary comprising a set of participants contributing at least one message in the plurality of messages and a set of summary sentences summarizing contents of a set of source messages in the plurality of messages;
 displaying, by a user interface, the summary within a summary display panel in response to a selection of the summary icon;
 mapping, by a mapping component, a set of links associated with the set of summary sentences to a set of source messages; and
 displaying a source message in the set of source messages within a message display panel of the user interface in response to activation of a link in the set of links associated with a summary sentence in the set of summary sentences, wherein the source message is a message from which at least a portion of the contents of the summary sentence is derived.

9. The method of claim 8, further comprising:
 customizing presentation of the summary in accordance with a customizable summary format corresponding to a selected user-configurable template selected by a user.

10. The method of claim 8, further comprising:
 displaying an identifier associated with a participant contributing to at least one source message providing at least a portion of the contents to the summary sentence in response to activation of a hover sender name option associated with at least one summary sentence in the set of summary sentences.

11. The method of claim 8, further comprising:
creating a set of nested summaries, the set of nested summaries comprising a first nested summary summarizing contents of a first set of messages in the plurality of messages and a second nested summary summarizing contents of a second set of messages in the plurality of messages.

12. The method of claim 8, wherein the summary is a first summary of a first set of messages in the plurality of messages associated with a first subject-matter within the multi-message conversation thread, the first summary comprising a first set of summary sentences and a first set of participants, and further comprising:
creating a second summary of a second set of messages in the plurality of messages associated with a second subject-matter within the multi-message conversation thread, the second summary comprising a second set of summary sentences and a second set of participants.

13. The method of claim 8, further comprising:
updating, within a summary display panel presented within a user interface device, the summary in response to receiving at least one of a set of new messages in the multi-message conversation thread or user-provided feedback.

14. The method of claim 8, further comprising:
annotating the summary, wherein at least one annotation comprises a per-participant response count indicating a number of messages in the plurality of messages contributed by each participant in the set of participants.

15. One or more computer storage devices having computer-executable instructions for generating customized multi-message conversation summaries that, upon execution by a processor, cause the processor to perform operations comprising:
presenting a summary icon associated with a multi-message conversation thread in response to a number of messages in the multi-message conversation thread exceeding a threshold number of messages;
creating a summary of the multi-message conversation thread, including a listing of participants contributing at least one message within the multi-message conversation thread and at least one summary sentence summarizing contents of the multi-message conversation thread; and
displaying at least a portion of at least one source message in the multi-message conversation thread from which at least a portion of a summary sentence is derived in response to activation of a link associated with the summary sentence in a set of summary sentences.

16. The one or more computer storage devices of claim 15, wherein the operations further comprise:
customizing presentation of the summary in accordance with a customizable summary format corresponding to a selected user-configurable template selected by a user.

17. The one or more computer storage devices of claim 15, wherein the operations further comprise:
displaying an identifier associated with a participant contributing to at least one source message providing at least a portion of the contents to at least one summary sentence in response to activation of a hover sender name option associated with the at least one summary sentence in the set of summary sentences.

18. The one or more computer storage devices of claim 15, wherein the operations further comprise:
creating a set of nested summaries, the set of nested summaries comprising a first nested summary summarizing contents of a first set of messages in a plurality of messages and a second nested summary summarizing contents of a second set of messages in the plurality of messages.

19. The one or more computer storage devices of claim 15, wherein the operations further comprise:
updating, within a summary display panel presented within a user interface device, the summary in real-time in response to receiving a set of new messages in the multi-message conversation thread.

20. The one or more computer storage devices of claim 15, wherein the operations further comprise:
annotating the summary, wherein at least one annotation comprises a per-participant response count indicating a number of messages in a plurality of messages contributed by each participant.

\* \* \* \* \*